United States Patent
Jhunjhnuwala et al.

(10) Patent No.: US 10,055,499 B2
(45) Date of Patent: Aug. 21, 2018

(54) SYSTEM FOR PROVIDING INFORMATION RELATING TO POINTS OF INTEREST

(71) Applicant: Phind, Inc., Irvine, CA (US)

(72) Inventors: Rishi Jhunjhnuwala, Irvine, CA (US); Dmitry Semenov, Newport Beach, CA (US)

(73) Assignee: PHIND, INC., Irvine, CA (US)

( * ) Notice: Subject to any disclaimer, the term of this patent is extended or adjusted under 35 U.S.C. 154(b) by 262 days.

(21) Appl. No.: 14/825,066

(22) Filed: Aug. 12, 2015

(65) Prior Publication Data
US 2015/0347603 A1   Dec. 3, 2015

Related U.S. Application Data

(63) Continuation-in-part of application No. 14/078,108, filed on Nov. 12, 2013, now abandoned.

(60) Provisional application No. 62/163,919, filed on May 19, 2015.

(51) Int. Cl.
*G06F 17/30* (2006.01)
*G06Q 30/02* (2012.01)

(52) U.S. Cl.
CPC .... *G06F 17/30867* (2013.01); *G06F 17/3053* (2013.01); *G06F 17/30097* (2013.01); *G06F 17/30268* (2013.01); *G06F 17/30554* (2013.01); *G06Q 30/0261* (2013.01)

(58) Field of Classification Search
CPC ................................. G06F 17/30867
USPC ......................................................... 707/734
See application file for complete search history.

(56) References Cited

U.S. PATENT DOCUMENTS

| | | | | |
|---|---|---|---|---|
| 2010/0277611 | A1* | 11/2010 | Holt ................... | G06F 17/30265 348/231.2 |
| 2010/0310182 | A1* | 12/2010 | Kroepfl .............. | G06K 9/00624 382/216 |
| 2013/0073686 | A1* | 3/2013 | Sandholm ........... | G06F 17/3087 709/219 |
| 2013/0295894 | A1* | 11/2013 | Rhoads ............. | G06F 17/30244 455/414.1 |

OTHER PUBLICATIONS

Intenational Search Report and Written Opinion issued in PCT/US16/33128 dated Aug. 19, 2016.

* cited by examiner

*Primary Examiner* — Chelcie Daye
(74) *Attorney, Agent, or Firm* — Jeffer Mangels; Butler & Mitchell LLP; Brennan C. Swain, Esq.

(57) ABSTRACT

A digital search system for processing and transmitting data structures comprising information relating to points of interest based on a digital image file containing a photo taken by a device. The digital search system includes a location-based retrieval module and an image matching module for receiving and processing digital image files. The system generates a set of places of interest based on the location and heading of the device and the image-based retrieval module and transmits a final results list to the device.

15 Claims, 29 Drawing Sheets

US 10,055,499 B2

SYSTEM FOR PROVIDING INFORMATION RELATING TO POINTS OF INTEREST

CROSS REFERENCE TO RELATED APPLICATIONS

This application is a continuation in part of U.S. patent application Ser. No. 14/078,108, filed Nov. 12, 2013, and claims the benefit of U.S. Patent Application No. 62/163,919, filed May 19, 2015, which are both herein incorporated by reference in their entireties.

FIELD OF THE INVENTION

The present invention relates generally to a digital search system for retrieving and providing information relating to points of interest based upon factors including at least one of a device's location, heading, range, or the contents of an image taken by a device.

BACKGROUND OF THE INVENTION

Mobile device use has been increasing after the introduction of smartphones, smart-cameras and other "smart" devices connected to a data feed. These machines act as pocket computers for many individuals. With these devices, users are able to access information based upon mobile GPS functionality. Social media applications also hold millions of users captivated on a daily basis with the sharing of photos taken from a mobile device.

The present invention takes the popularity of mobile photo functionality and pairs it with the device's technical capabilities and provides a new experience to users by presenting them with informative content related to the "place" within the captured image by utilizing the location, heading and/or range of the device at the time of the image capture. The process utilized to make this experience possible is based upon the device capabilities and the system architecture. In the preferred embodiment, the mobile device collects the data needed to request relevant "places" information from the server.

SUMMARY OF THE PREFERRED EMBODIMENTS

In accordance with a preferred embodiment of the present invention there is provided a digital search system for processing and transmitting information relating to points of interest based on a location and heading of a device. T digital search system includes a server for receiving and processing the device location and heading information, and a filtering module for filtering a first group of places of interest to provide a first set of places of interest. The filtering module is programmed to: 1) receive at least one place of interest to form the first group of places of interest; 2) exclude places of interest having a location outside of a predetermined radial range from the device location; and 3) if the number of remaining places of interest exceeds a first predetermined quantity, exclude the places of interest having locations that are the greatest distance from the device until the number of remaining places of interest does not exceed the first predetermined quantity, whereby the first set of places of interest is provided. The system also includes a data file comprising at least one confirm count related to a point of interest, and a sorting module for receiving and processing the first set of places of interest to provide a second set of places of interest. The sorting module is programmed to: 1) receive the first set of places of interest; 2) order the places of interest based on the confirm count; and 3) if the number of places of interest exceeds a second predetermined quantity, exclude the places of interest that are ordered last according to step 2, until the number of remaining places of interest does not exceed the second predetermined quantity, whereby the second set of places of interest is provided.

In a preferred embodiment, the server is programmed to search for points of interest within the predetermined radial range from the device. Preferably, the server uses an API to search for points of interest within the predetermined radial range from the device. In a preferred embodiment, the sorting module is further programmed to sort the places of interest based on a category related to a point of interest.

In a preferred embodiment, the filtering module is further programmed to exclude points of interest having a location outside of a first triangle shaped range near the location of the device. The first triangle shaped range starts from the location of the device and spreads out away from the location of the device in the direction of the heading of the device. The first triangle shaped range spreads out at a first angle from the location of the device with respect to the heading of the device. The first triangle shaped range also extends a first distance from the location of the device in the direction of the heading of the device. In a preferred embodiment, the filtering module is further programmed to exclude points of interest having a location outside of a second triangle shaped range near the location of the device, wherein the second triangle shaped range starts from the location of the device and spreads out away from the location of the device in the direction of the heading of the device, and the second triangle shaped range extends further away from the location of the device than the first triangle shaped range. The second triangle shaped range spreads out at a second angle from the location of the device with respect to the heading of the device. The second triangle shaped range also extends a second distance from the location of the device in the direction of the heading of the device. Preferably, the second angle is less than the first angle and the second distance is greater than the first distance.

In a preferred embodiment, the system includes a software application executing on the device for transmitting the location and heading of the device to the server, receiving collected information transmitted from the server, and displaying the collected information to a user. Preferably, the software application provides a user interface, whereby the software application transmits the location and heading of the device to the server, receives collected information transmitted from the server, and displays the collected information in response to a single user interaction. Preferably, the user interface allows a user to confirm a point of interest, and the server increments the confirm count related to a point of interest in response to the user's confirmation.

In accordance with another aspect of the present invention there is provided a digital search system for processing and transmitting data structures comprising information relating to points of interest based on a digital image file. The digital search system includes an image matching module for receiving and processing digital image files. The image matching module is programmed to: 1) receive a digital image file; 2) convert the digital image file to a first data structure having at least one hash value; 3) search for hash values corresponding to images similar to the image in the digital image file; and 4) return a second data structure comprising results from the search in step 3. The digital search system also includes a filtering module for receiving and processing data structures. The filtering module is programmed to: 1) receive a third data structure comprising hash values corresponding to images; and 2) return a fourth data structure comprising metadata related to images to which the hash values in the third data structure correspond, but excluding metadata where the hash values in the third data structure correspond to an image having a location that exceeds a predetermined distance from the location of the device that captured the digital image file. The digital search system also includes a server for receiving and processing a digital image file from a device used to take a photo and returning metadata related to similar images. The server is programmed with one or more software routines executing on the server to: 1) search for images similar to that in the digital image file; 2) filter the results of the search in step 1; 3) transmit a fourth data structure comprising metadata including a title related to the results of step 2.

In a preferred embodiment, step 3 of the image matching module uses multiple searchers that simultaneously search for data structures relating to images similar to the image in the digital image file, and wherein step 4 comprises combining and filtering the results of step 3 to generate the second data structure if more than one searcher of step 3 returns a result. Preferably, the results of the search in step 3 of the image matching module comprise hash values corresponding to images similar to the image in the digital image file and a matching score. In a preferred embodiment, the digital search system also includes an indexing module for indexing digital image files. The indexing module is programmed to: 1) read a digital image file; 2) generate a codebook; 3) read the codebook and at least one digital image file; and 4) generate an image index.

In a preferred embodiment, the digital search system also includes a software application executing on the device to: 1) take a photograph; 2) transmit to the server the digital image file including the photograph; 3) receive a list comprising metadata relating to the contents of the digital image file; and 4) displaying the list to a user. Preferably, the software application provides a user interface, whereby the software application performs the steps above in response to a single user interaction. Preferably, the user interface allows a user to confirm a result on a displayed list, and the server increments a confirm count related to a result in response to the user's confirmation.

In accordance with another aspect of the present invention, there is provided a digital search system for processing and transmitting data structures comprising information relating to points of interest based on a digital image file containing a photo taken by a device and the location and heading of the device. The digital search system includes a location-based retrieval module and an image-based retrieval module. The location-based retrieval module includes a location-based filtering module for filtering a first group of places of interest to provide a first set of places of interest. The filtering module is programmed to: 1) receive at least one place of interest to form the first group of places of interest; 2) exclude places of interest having a location outside of a predetermined radial range from the device location; and 3) if the number of remaining places of interest exceeds a first predetermined quantity, exclude the places of interest having locations that are the greatest distance from the device until the number of remaining places of interest does not exceed the first predetermined quantity, whereby the first set of places of interest is provided. The location-based retrieval module also includes a sorting module for receiving and processing the first set of places of interest to provide a second set of places of interest. The sorting module is programmed to: 1) receive the first set of places of interest; 2) order the places of interest based on the confirm count; and 3) if the number of places of interest exceeds a second predetermined quantity, exclude the places of interest that are ordered last according to step 2, until the number of remaining places of interest does not exceed the second predetermined quantity, whereby the second set of places of interest is provided. The location-based retrieval module also includes a data file that includes at least one confirm count related to a point of interest. The image-based retrieval module includes an image matching module for receiving and processing digital image files. The image matching module programmed to: 1) receive a digital image file; 2) convert the digital image file to a first data structure having at least one hash value; 3) search for hash values corresponding to images similar to the image in the digital image file; and 4) return a second data structure comprising results from the search in step 3. The image-based retrieval module also includes a filtering module for receiving and processing data structures. The filtering module is programmed to: 1) receive a third data structure comprising hash values corresponding to images; and 2) return a fourth data structure comprising metadata related to images to which the hash values in the third data structure correspond, but excluding metadata where the hash values in the third data structure correspond to an image having a location that exceeds a predetermined distance from the location of the device that captured the digital image file. The image-based retrieval module also includes one or more software routines executing to 1) search for images similar to that in the digital image file; 2) filter the results of the search in step 1; 3) generate the fourth data structure comprising metadata including a title related to the results of step 2; and The digital search system also includes a server for receiving and processing a digital image file and the location and heading of a device used to take the image in the digital image file. The server is programmed with one or more software routines executing on the server to: 1) simultaneously use the location-based retrieval module to generate the second set of places of interest based on the location and heading of a device, and the image-based retrieval module to generate the fourth data structure; 2) combine the second set of places of interest and the fourth data structure into a final results list; and 3) transmit the final results list to the device.

In a preferred embodiment, the digital search system also includes a software application executing on the device to: 1) take a photograph; 2) transmit to the server a digital image file comprising the photograph, the location of the device, and the heading of the device; 3) receive a list transmitted from the server; and 4) display the list to a user. Preferably, the software application provides a user interface, whereby the software application performs the steps above in response to a single user interaction. In a preferred embodiment, the user interface allows a user to confirm a result in the displayed list, and wherein the server increments the confirm count related to the result in response to the user's confirmation.

The present invention is directed to a system and method of providing place (e.g., business, landmark, statue, monument, landmark, building, hotel, restaurant, etc.) relevant information based upon a mobile device's location and heading information. Taking a picture of a landmark or business will return results of information for places related to the area and in proximity to the origination of the image. For example, multiple businesses and landmarks including names, descriptions and other related data may be provided as search results based upon the image's location, heading and/or range. In other words, the search criteria may be based upon the mobile device's location, heading and/or defined ranges at the time of the picture being taken by the mobile user. The user may help define the correct result by confirming a result as a match to the "place" within the picture. Future users who capture photos within that same general proximity will receive refined search results based upon past users' "place" confirmation matches to images. Over time the database query factors will provide users with an experienced sense of image recognition due to potentially more accurate results.

In a preferred embodiment, the present invention is comprised of a computer database for storing information, the database configured to store information relating to points of interest including businesses and landmarks, the database adapted to store for each point of interest the location of the point of interest, and its name; a server for receiving device location and heading information from a device used to take the photo, the server programmed with one or more software routines executing on the server to: 1) process the device location and heading information to search for points of interest within a predetermined range of the device location and heading; 2) collect information relating to the points of interest within the predetermined range of the device location and heading; 3) communicate the collected information relating to the points of interest to the device used to take the photo.

In a preferred embodiment, the server is programmed with one or more software routines executing on the server to search for points of interest within a predetermined radial range around the location of the device and conical shaped range near the location of the device. The conical range preferably starts from the location of the device and spreads out towards the direction of the heading of the device.

In one embodiment, the system is programmed with one or more software routines executing on the server to accept confirmations from users for points of interest communicated to the devices, to count the number of user confirmations for each point of interest, and to give the points of interest with the highest user confirmations the highest priority in the displayed results.

The system is also preferably configured to accept registrations from businesses and to allow registered businesses to offer deals. The server collects information relating to businesses nearby the predetermined range of the device location and heading that are offering deals to users and communicates the results to the device for display to the user.

DETAILED DESCRIPTION OF THE PREFERRED EMBODIMENTS

Figure 1:
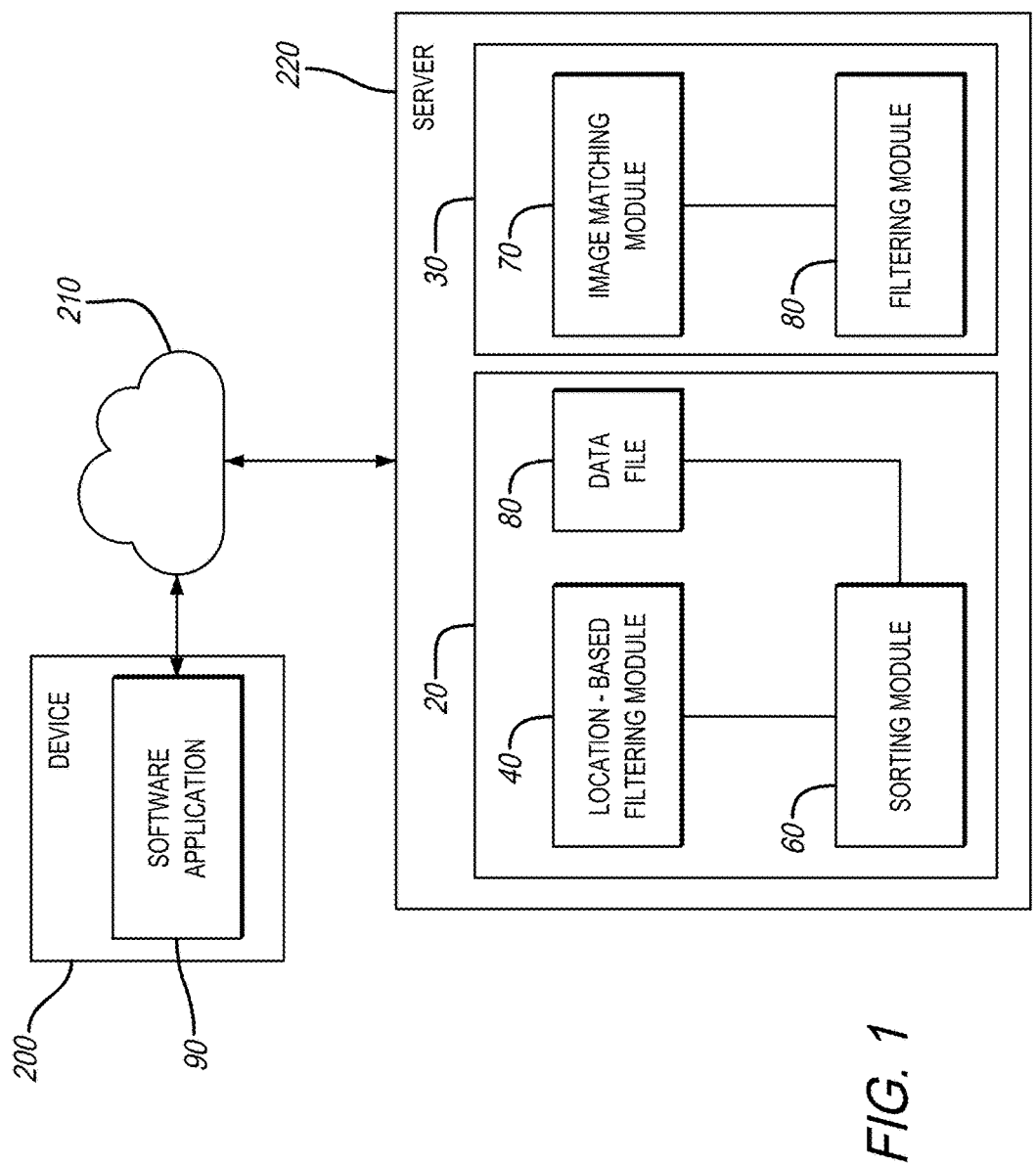
FIG. 1 illustrates a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

The detailed description provides explanations by way of exemplary embodiments. It is to be understood that other embodiments may be used having mechanical and electrical changes that incorporate the scope of the present invention without departing from the spirit of the invention.

While certain embodiments of the present invention are described in detail above, the scope of the invention is not to be considered limited by such disclosure, and modifications are possible without departing from the spirit of the invention as evidenced by the following claims.

Referring now to the drawings, wherein the showings are for purposes of illustrating the present invention and not for purposes of limiting the same, the drawings show a digital search system 100 in accordance with preferred embodiments of the present invention.

FIG. 1 illustrates a preferred embodiment of the present invention. In a preferred embodiment, there is provided a software application (90) running on a device (200), which is in communication with a server (220) via a network (210). In a preferred embodiment, the software application (90) transmits a digital image file (470) (see FIG. 14) to the server (220) via network (210). In a preferred embodiment, the server (220) comprises and uses both location-based retrieval logic or module (20) and image-based retrieval logic or module (30) in order to retrieve search results, which are then combined and returned to the software application (90) for display on the device (200). The results from image and location are compared and combined if there are duplicates. If there are no duplicates then image gets higher priority. Preferably, results received from the image-based retrieval module (30) will have higher priority than the results received from the location-based retrieval module (20) in the list of results that is returned to the device (200). However, the opposite can also be used. Those of ordinary skill in the art will also appreciate that in a preferred embodiment, server (220) may also use only one of either image-based retrieval module (30) or location-based retrieval module (20) to retrieve search results. In a preferred embodiment, the location-based retrieval module (20) uses a location-based filtering module (40), sorting module (60), and a data file (50). Preferably, the image-based retrieval module (30) uses an image matching module (70) and a filtering module (80).

Figure 2:
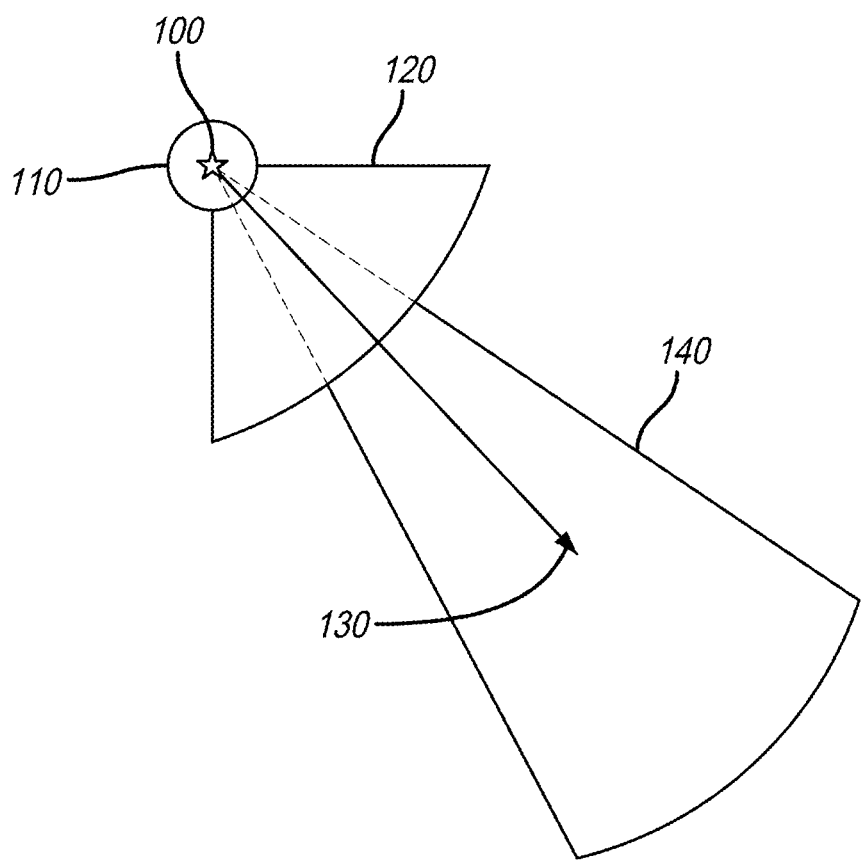
FIG. 2 illustrates the data used by a preferred embodiment of the present invention to retrieve location-relevant information relating to a device.

FIG. 2 illustrates the data used by a first preferred embodiment of the present invention to retrieve place relevant information relating to a device (e.g., mobile device) of the user taking the photo. In a preferred embodiment, the present invention collects the device's current location (100), the device's heading (130), near/radial range (110), near/wide range (120), and far range (140). The location (100) is preferably determined using the device's GPS latitude and longitude.

Figure 3:
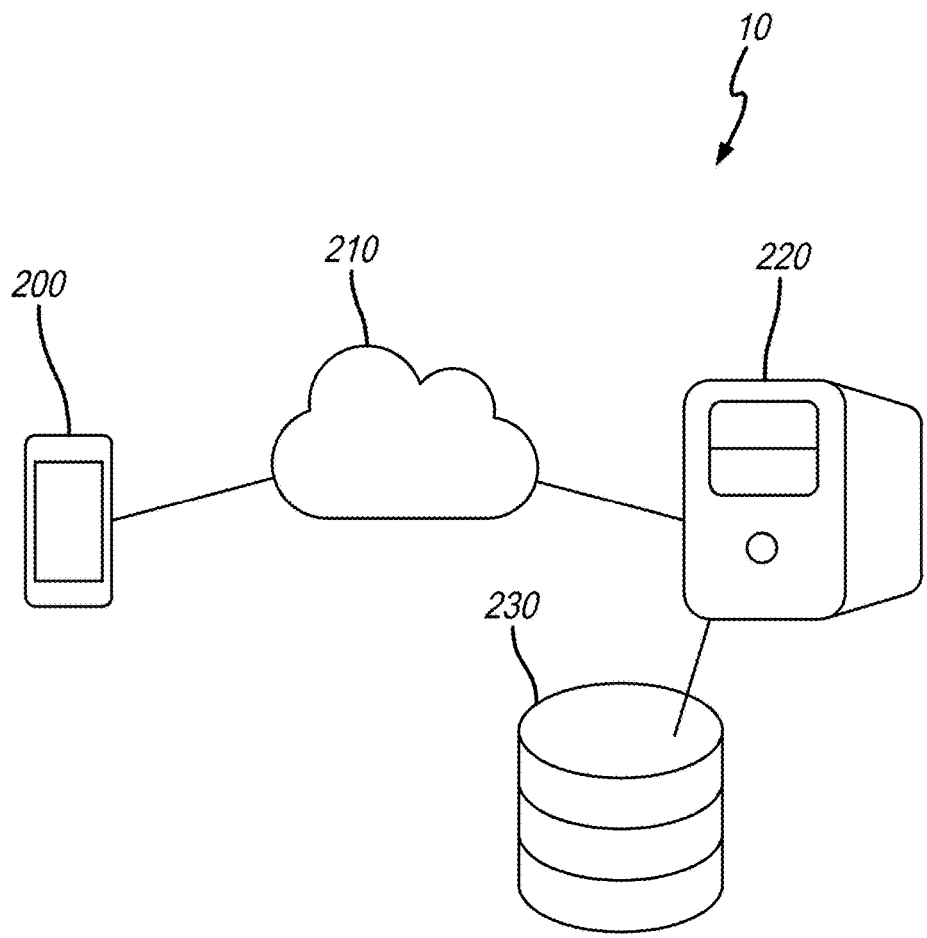
FIG. 3 illustrates a preferred embodiment of the system of the present invention.
Figure 4:
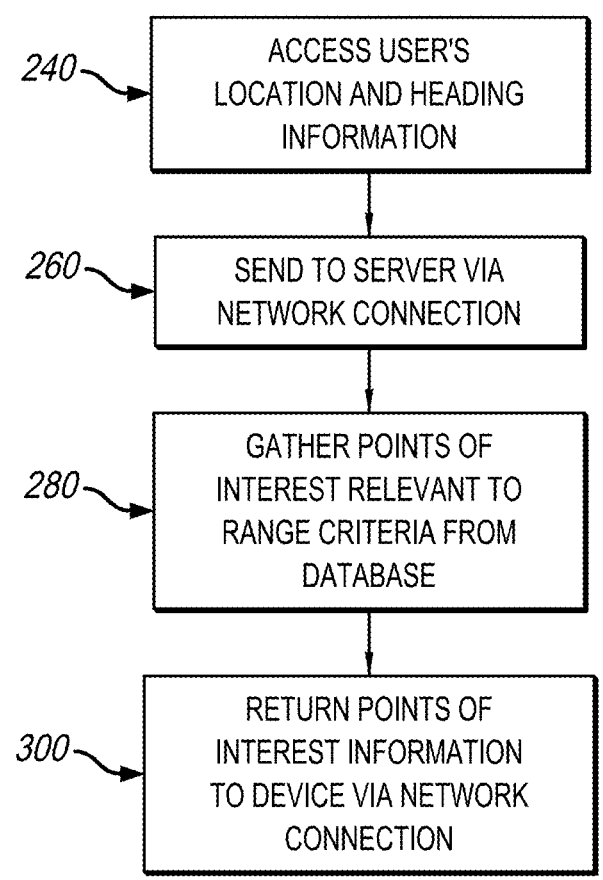
FIG. 4 illustrates a flowchart showing some of the process steps of a preferred embodiment of the present invention.

FIG. 3 illustrates a preferred embodiment of the system of the present invention. FIG. 4 illustrates a flowchart showing some of the basic process steps of a preferred embodiment. In a preferred embodiment, a mobile device (200) communicates with a server (220) through a WiFi network or data Internet connection (210). Preferably, the server (220) collects the data from a database (230).

The mobile device (200) collects the device's current location (100) and the device's (200) heading (130)(240) which is adjusted based upon the device's (200) orientation then submits to the server (220)(260) the location (100), heading (130), near/radial range (110), near/wide range (120), and far range (140). Preferably, the location (100) is determined using the mobile devices (200) GPS latitude and longitude.

In a preferred embodiment, the heading (130) is determined by the device's (200) orientation and the direction that the camera is pointed. The near/radial range (110) is the circular 360 degree radius directly around the mobile device (200) with it acting as the center point based upon the location (100). The near/wide range (120) is the hard coded cone shaped distance reaching out from the device's (200) location (100) as the base of the cone. The far range (140) begins with the device location as the base of the point and stretches out to a further and thinner cone shaped zone distance than the near/wide range (120). It will be appreciated by those of ordinary skill in the art that the exact distances for each of these ranges can be varied as needed, as long as they are within a range of 1 to 6000 meters. For example, the ranges can be made smaller for more focused results and made larger for a wider range of results.

In a preferred embodiment of the present invention, after the collection of the location (100), near/radial range (110), near/wide range (120), heading (130), and far range (140), the device (200) communicates these data items to the server (220), preferably via a network connection (210)(260). In a preferred embodiment, the server (220) queries the database (230) for points of interest related to the location (100), heading (130) and range (110, 120, 140) criteria (280).

In a preferred embodiment of the present invention, the server (220), and associated processing system, and database (230) system will determine the relevant points of interest based upon 5 factors and present them to the user (300). These points of interest determining factors are sorted based upon a priority level with the highest level factor being more relevant to the user's experience. These preferred factors, with the highest factor listed first are:

1. Business with confirm count>0 (highest to lowest) (0-500 meters from location);
2. Locations with Wikipedia OR Factual category "Landmark" AND confirm count>0 (Highest to lowest) (0-3200 meters);
3. Businesses with confirm count-0 (0-500 meters);
4. Locations with Wikipedia OR Factual category "Landmark" AND confirm count-0 (0-3200 meters);
5. Businesses with Deals (500-3200 meters) sorted by confirm count (Highest to lowest).

In a preferred embodiment, a confirm count is the sum of all users that previously identified a "place" search result as a business or landmark that they were taking a picture of. For example, if a user takes a picture of Alcatraz Island and the results are returned with the Golden Gate Bridge listed first, the user would likely go to the next search result without confirming the result because the Golden Gate Bridge does not match the user's expectation. If the next result is Alcatraz, the user would likely press the "confirm" button displayed by the present invention (in association with the search result) to confirm (i.e., identify) the Alcatraz search result as the place that was the focal point of the user's photo and as the result the user expected.

If within that same general area 100 users take pictures and 70 of them confirm the Alcatraz search result, then the first result listed will be Alcatraz (assuming it has the highest confirm count). If, over time, 500 users take a picture within that same general area and 350 confirm the Golden Gate Bridge search result, and the confirm count for Alcatraz only increased to 100 confirms, then the first result listed by the present invention will now be the Golden Gate Bridge search result. This feature of a preferred embodiment of the present invention allows the users to drive the experience by identifying what they expect as the returned result from their photo. In the preferred embodiment, the server of the present invention will record these confirms and run a calculation after every user photo to then display the sorted results based upon the up-to-date confirm counts.

The first preferred factor queries the database for all points of interest (e.g., business and/or landmark listings) within the database (230) containing a confirm count of greater than zero and that are located within the defined location (100), heading (130) and range (110, 120, 140) and that are no greater than 500 meters from the device's (200) exact location (100). Factor one results are sorted by highest to lowest confirm count. Again, those of ordinary skill in the art will appreciate that the distance of 500 meters can be changed to any distance within the range of 1-6000 meters based on the desired level of focus.

The second preferred factor queries the database (230) for all points of interest listings with a confirm count greater than zero and that are located within the defined location (100), heading (130) and range (110, 120, 140) and that are no greater than 3200 meters from the device's (200) exact location (100). Factor two results are sorted by highest to lowest confirm count. Specifically, in one example embodiment, the server (220) receives content from a third party database or service such as Wikipedia and/or Factual to search for relevant points of interest within the range of the device. For example, the server (220) of a preferred embodiment calls the Wikipedia API and Factual API to receive content from their databases for latitude and longitudes that reside within the three location/heading defined ranges. That content is then pulled into the database (230) that can be queried for relevant points of interest based upon the search priority list discussed above. For places that exist within the database of the present invention, the Wiki content is preferably merged to those places as the description content. In another preferred embodiment, the server (220) can call into the third party services (APIs) or databases and conduct a direct query of those third party databases to retrieve relevant points of interest to merge into the content of the system database (230).

The third preferred factor queries the database (230) for points of interest listings with a confirm count equal to zero and that are located within the defined location (100), heading (130) and range (110, 120, 140) and that are no greater than 500 meters from the device's (200) exact location (100). Factor three results are sorted by highest to lowest confirm count.

The fourth preferred factor queries the database (230) for points of interest listings with a confirm count equal to zero and that are located within the defined location (100), heading (130) and range (110, 120, 140) and that are no greater than 3200 meters from the device's (200) exact location (100). Factor four results are sorted by highest to lowest confirm count.

The fifth preferred factor queries the database for points of interest listings that contain deals and that are located within the defined location (100), heading (130) and range (110, 120, 140) and that are between the distance of 500 to 3200 meters from the device's (200) exact location (100).

Factor five results are sorted by highest to lowest confirm count. Deals are defined as discounted promotions that are generated and published to the database by the business for the purpose of incentivizing the user to become a customer of that business. The server (220) then preferably communicates the points of interest to the mobile device (200) via a network internet connection (210).

In a preferred embodiment, image recognition may be used as part of the process of retrieving relevant search results. For example, image recognition could be added as the first item to the search priority list. The priority given to the image recognition is dependent on the accuracy of the image recognition. If it is extremely accurate then it should receive priority but if it is less accurate than it should receive a lower priority. It is also appreciated that image recognition may work better as a hybrid blended into each method on the priority list. E.g., add image recognition as a requirement to each existing item within the priority list. Image recognition results can also be categorized outside of the current 5 step classification where the results are presented to user as a separate category of results.

In a preferred embodiment, information relating to a place that was recognized are preferably retrieved and presented to the user, along with relevant data including, but not limited to, name, address, telephone number, photos of the point of interest, history, facts, shared photos, tours, attractions, top places nearby and user reviews. It is also appreciated that advertisements relating to the business may also be displayed. E.g., a business can register with the system of the present invention to provide deals within the application. For example, if a user creates a deal for business XYZ, then that deal is displayed within the ad tile presented by the present invention for business XYZ.

Separately, the last item within the search priority list may also refer to businesses that have ads but do not match the requirements of the other search priority list items. Those businesses will display last within the search results and are there to act as impressions only because they most likely don't match the user's photo. Nearby places preferably consist of ads placed by registered businesses that have defined category(s). For example a business can create an ad and define categories for the ad. If the business is nearby, their ad can show in "Nearby Places" of other locations that are of a matching category defined within the ad.

The screenshot images of the Figures illustrate the user interactions with the mobile application. These screenshots represent an example embodiment illustrating one type of user interface and user experience. The examples do not limit other design and flow potentials for mobile applications that would use the patented technical process.

Figure 5:
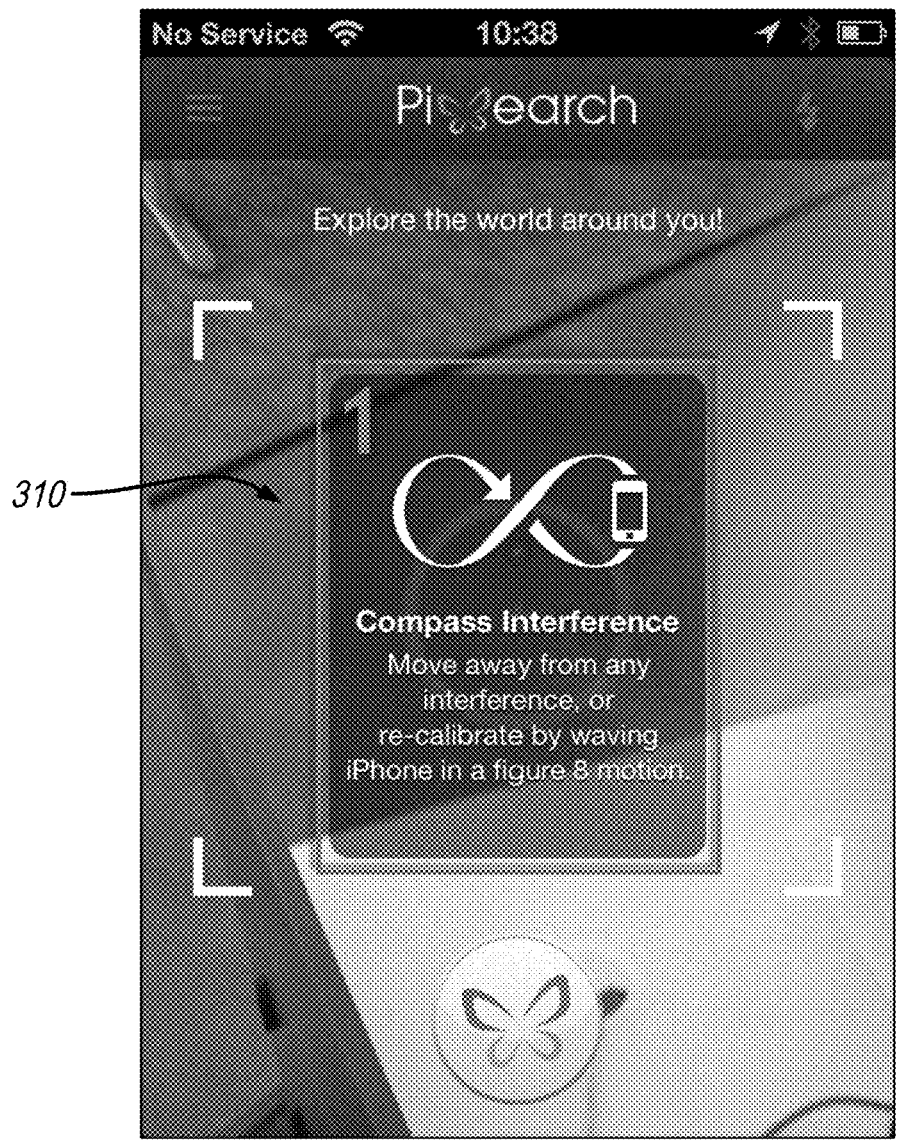
FIG. 5 illustrates an exemplary screenshot of a preferred embodiment of the present invention illustrating the compass calibration feature.

FIG. 5 illustrates an exemplary screenshot of the present invention illustrating the compass calibration feature of the present invention. The device compass is utilized to determine the heading of the mobile device. The user will need to ensure that the compass is properly calibrated to ensure that the application can determine the correct "places" results after taking a photo. The phone will recognize that the application is using the compass and ask the user to ensure calibration by waving the phone in a "FIG. 8" pattern (310, also shown in the Figure at reference numeral 1). After calibration the user will then be able to start the inventive process of taking a picture to learn about places in front of them.

Figure 6:
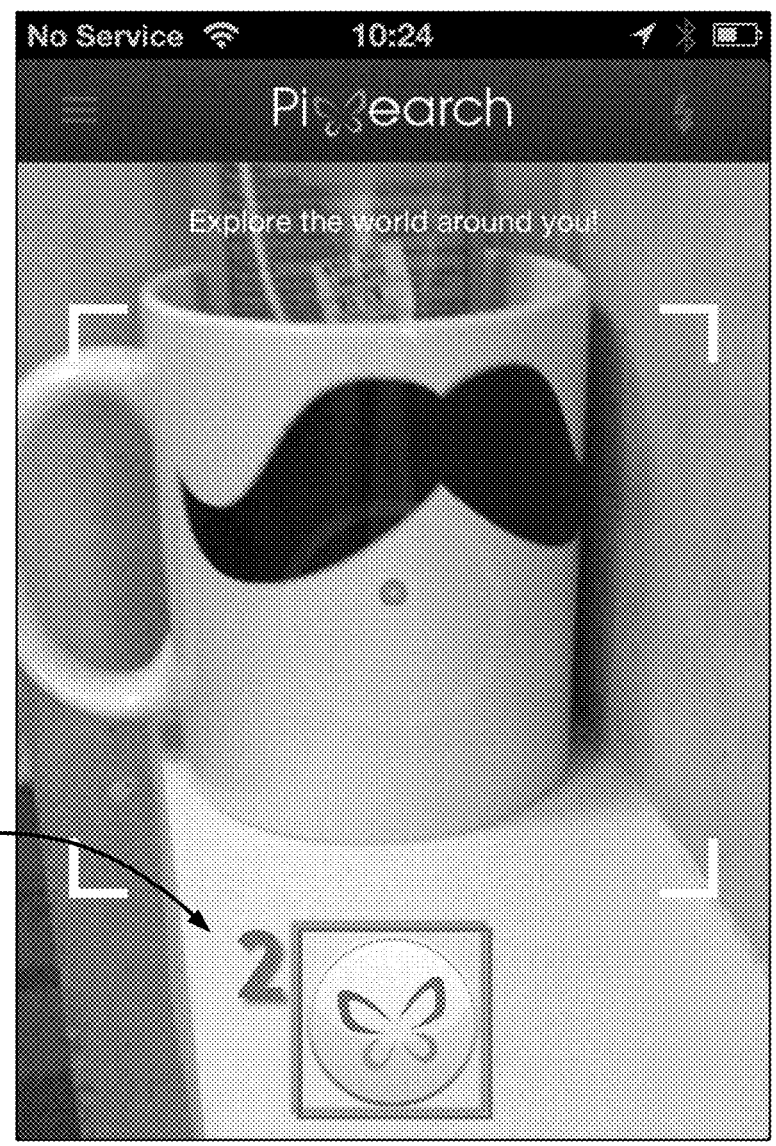
FIG. 6 illustrates an exemplary screenshot of a preferred embodiment of the present invention illustrating the user interface for taking a photo.

FIG. 6 illustrates an exemplary screenshot of the present invention illustrating the user interface for taking a photo. The user will point their camera at a place of interest and press the circular button to capture the photo (2, also shown in the Figure at reference numeral 320). This kicks off the process of collecting the location, heading and range details then communicates to the server to fetch results based upon the criteria. These details are fully explained within the Summary section above.

Figure 7:
FIG. 7 illustrates an exemplary screenshot of a preferred embodiment of the present invention illustrating how the present invention displays relevant search results.

FIG. 7 illustrates an exemplary screenshot of the present invention illustrating how the present invention displays relevant search results. After collecting the results they are returned to the application for the user to view. In the illustrated example, the application returned five total results for the combination of location, heading and range. The user can swipe those results (right or left) to view each individually (340, also shown in the Figure at reference numeral 3). Each result provides details about the place. To confirm a result as the correct place in the photo taken by the user, the user will press the check mark (360, also shown in the Figure at reference numeral 4). The user can also save this to their favorites by pressing the star (380, also shown in the Figure at reference numeral 5). The location and heading details are shown in the image above as an example only; in another embodiment, the end user will not see these within their experience.

Figure 8:
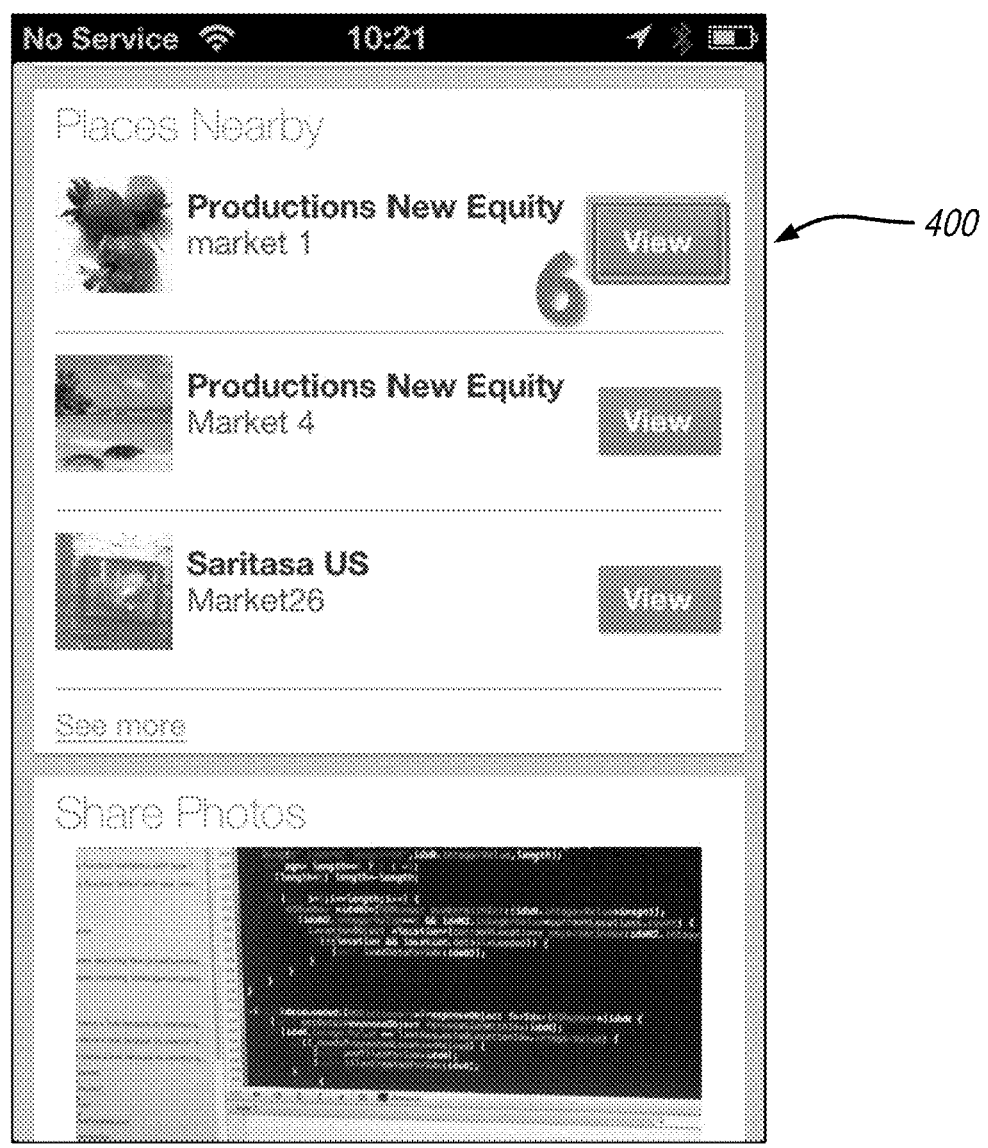
FIG. 8 illustrates an exemplary screenshot of a preferred embodiment of the present invention illustrating an example of additional details provided for a specific search result.

FIG. 8 illustrates an exemplary screenshot of a software application in a preferred embodiment of the present invention illustrating an example of the additional details that are provided for a specific search result. The user can scroll (up or down) to view additional details about each place result. This example shows the ability to view other places that are near this result (400, also shown in the Figure at reference numeral 6) and to view photos of this result that have been taken by other users (also shown in FIG. 8, 405 at reference numeral 7).

Figure 9:
FIG. 9 illustrates an exemplary screenshot of a preferred embodiment of the present invention illustrating the ability for users to provide reviews for each result.

FIG. 9 illustrates an exemplary screenshot of a software application in a preferred embodiment of the present invention illustrating an example of reviews that may be attached to each result. The user can write a review (410, also shown in the Figure at reference numeral 8) for the place which will then be publicly available for other application users to see.

Figure 10:
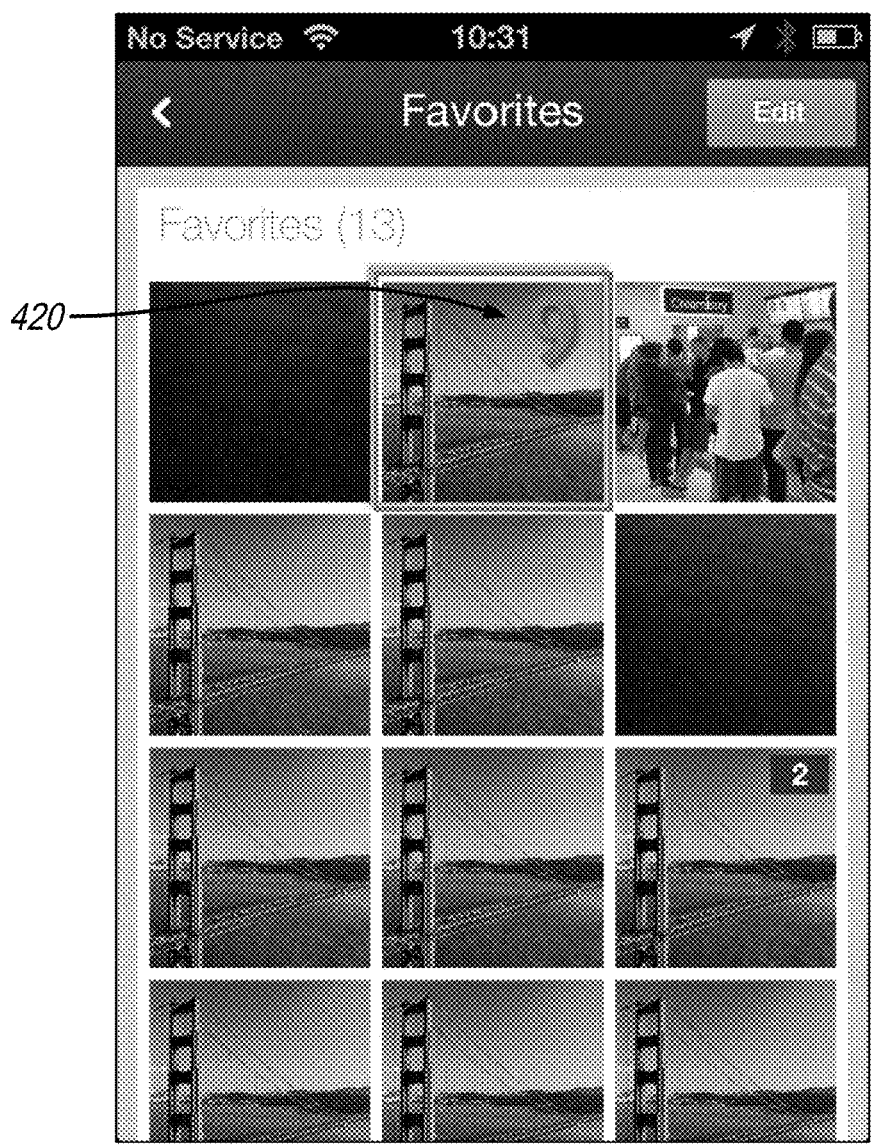
FIG. 10 illustrates an exemplary screenshot of a preferred embodiment of the present invention illustrating how users can instruct the application to save "favorites" of the search results.
Figure 11:
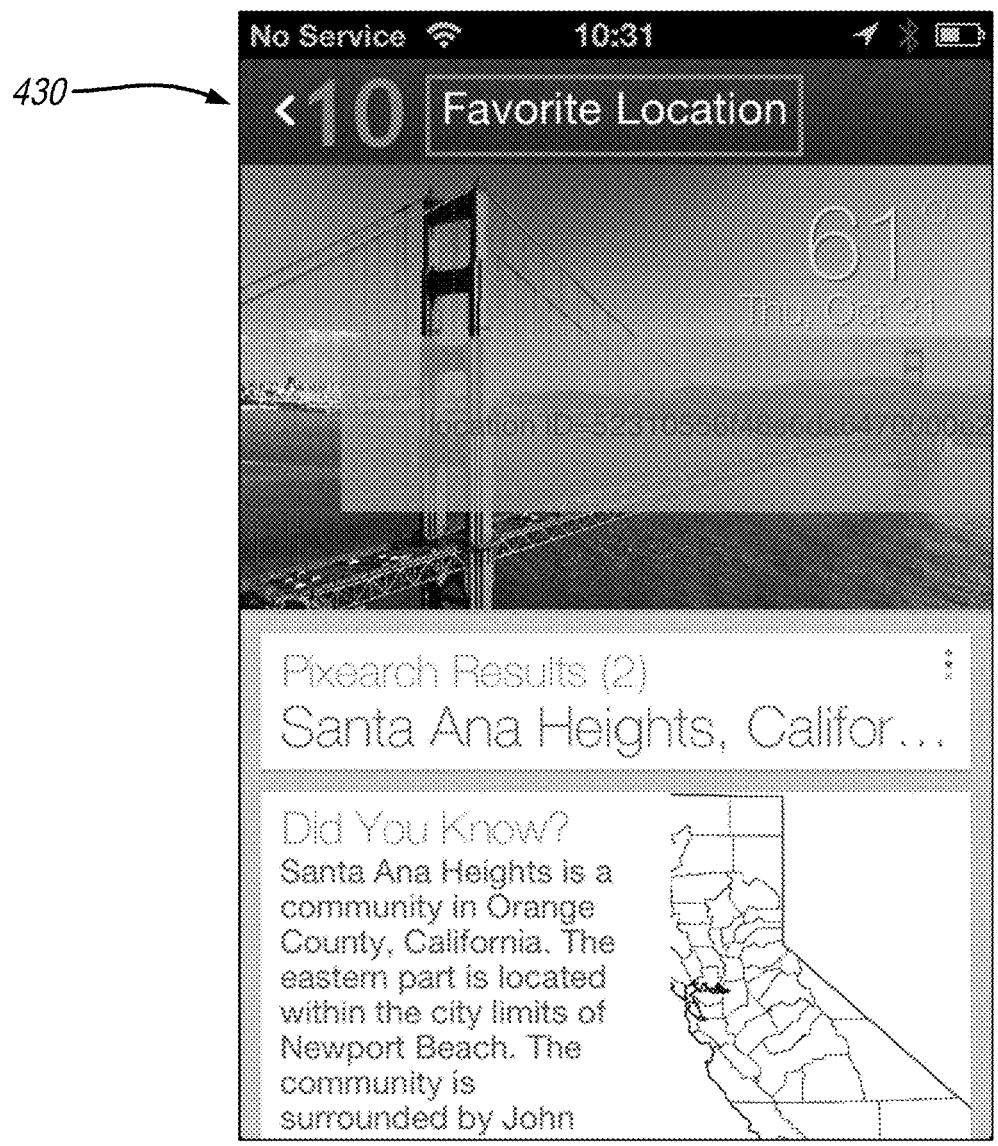
FIG. 11 illustrates an exemplary screenshot of a preferred embodiment of the present invention illustrating the ability to provide additional detail of favorite places.

FIG. 10 illustrates an exemplary screenshot of a software application in a preferred embodiment of the present invention illustrating how users can instruct the application to "favorite" each search result (420, also shown in the Figure at reference numeral 9). If the user indicates that a search result is a "favorite," the application will save that image with the result details to the favorites screen to view later without the need to retake the photo. FIG. 11 illustrates an exemplary screenshot of the present invention illustrating how the user can press on a favorite image to view the details (430, also shown in the Figure at reference numeral 10) about the place in that image.

Figure 12:
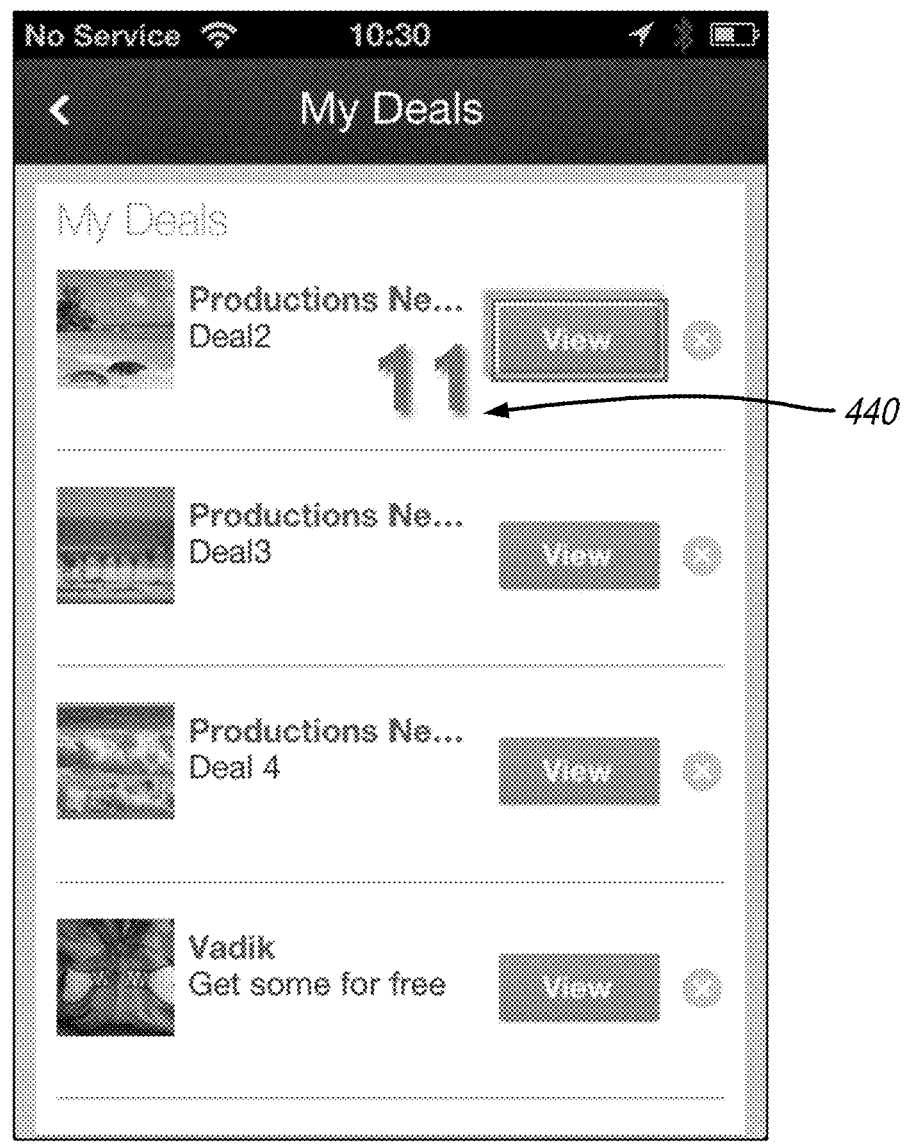
FIG. 12 illustrates an exemplary screenshot of a preferred embodiment of the present invention illustrating the ability to provide "deals" from businesses that are displayed to the user.
Figure 13:
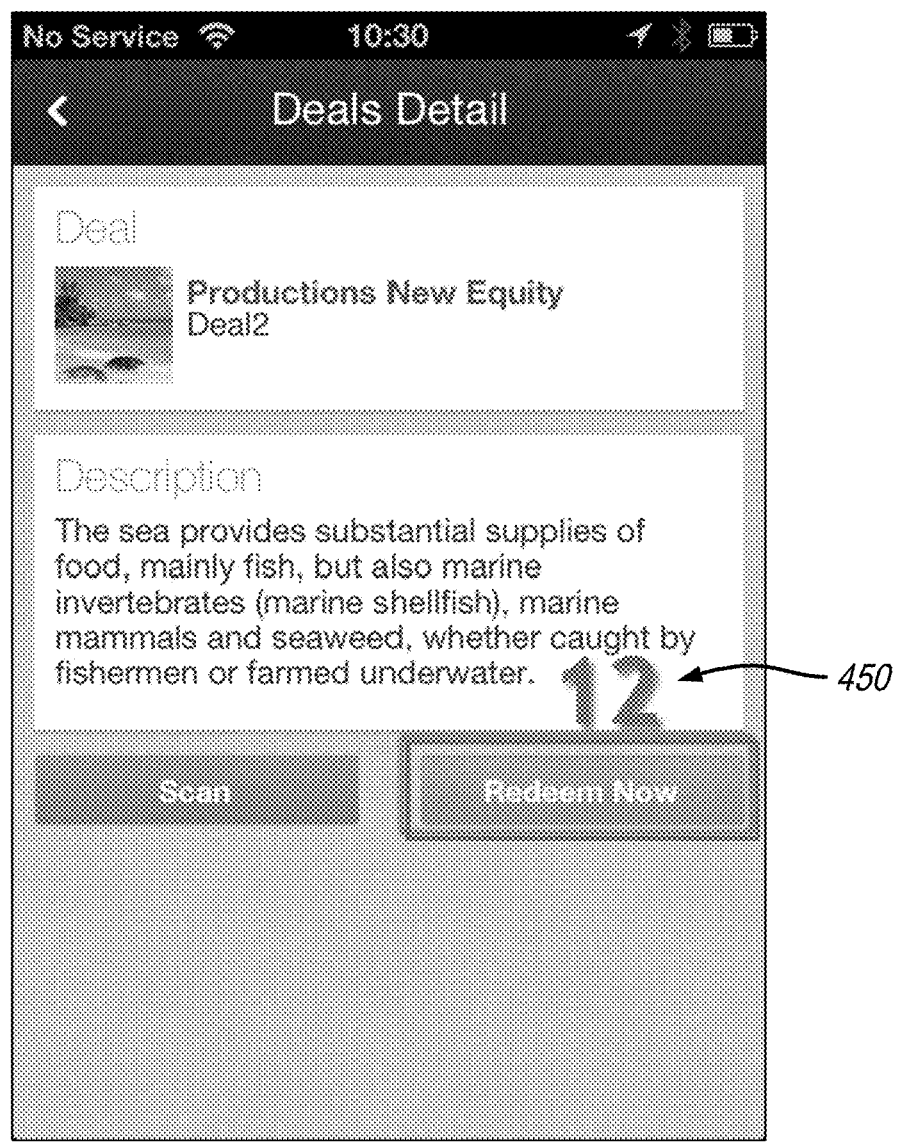
FIG. 13 illustrates an exemplary screenshot of a preferred embodiment of the present invention illustrating the "deals" detail screen where the user can redeem a deal.

FIG. 12 illustrates an exemplary screenshot of a software application in a preferred embodiment of the present invention illustrating deals from businesses displayed to the user. The "My Deals" screen (440, also shown in the Figure at reference numeral 11) displays the saved deals that are available to the user. This allows the user to save and redeem deals that are provided by subscribed businesses. FIG. 13 illustrates an exemplary screenshot of the present invention illustrating the deals detail screen where the user can redeem their deal (450, also shown in the Figure at reference numeral 12) at the business by scanning the application QR code at the counter.

Figure 14:
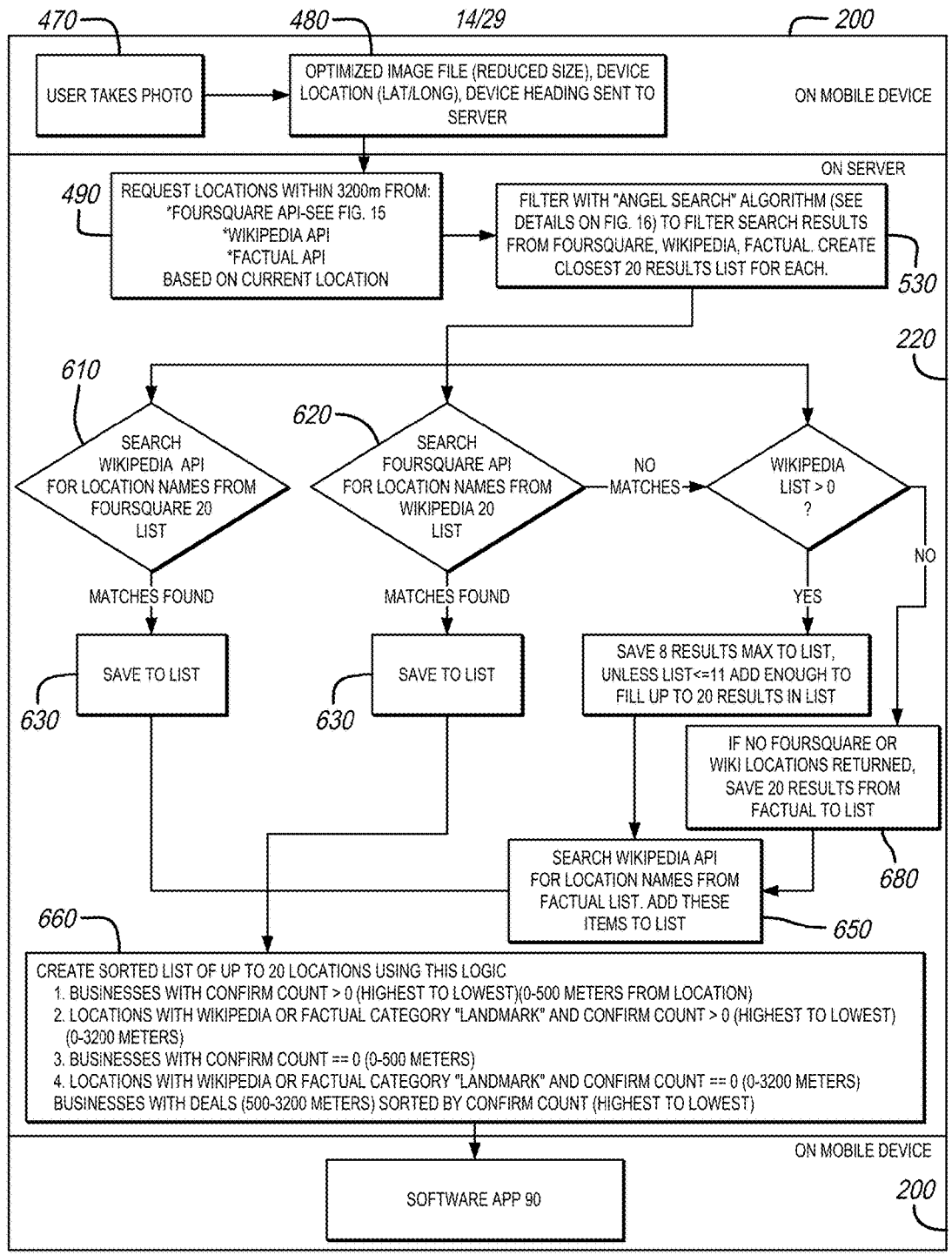
FIG. 14 illustrates the location retrieval logic used by an exemplary embodiment of the present invention.
Figure 15:
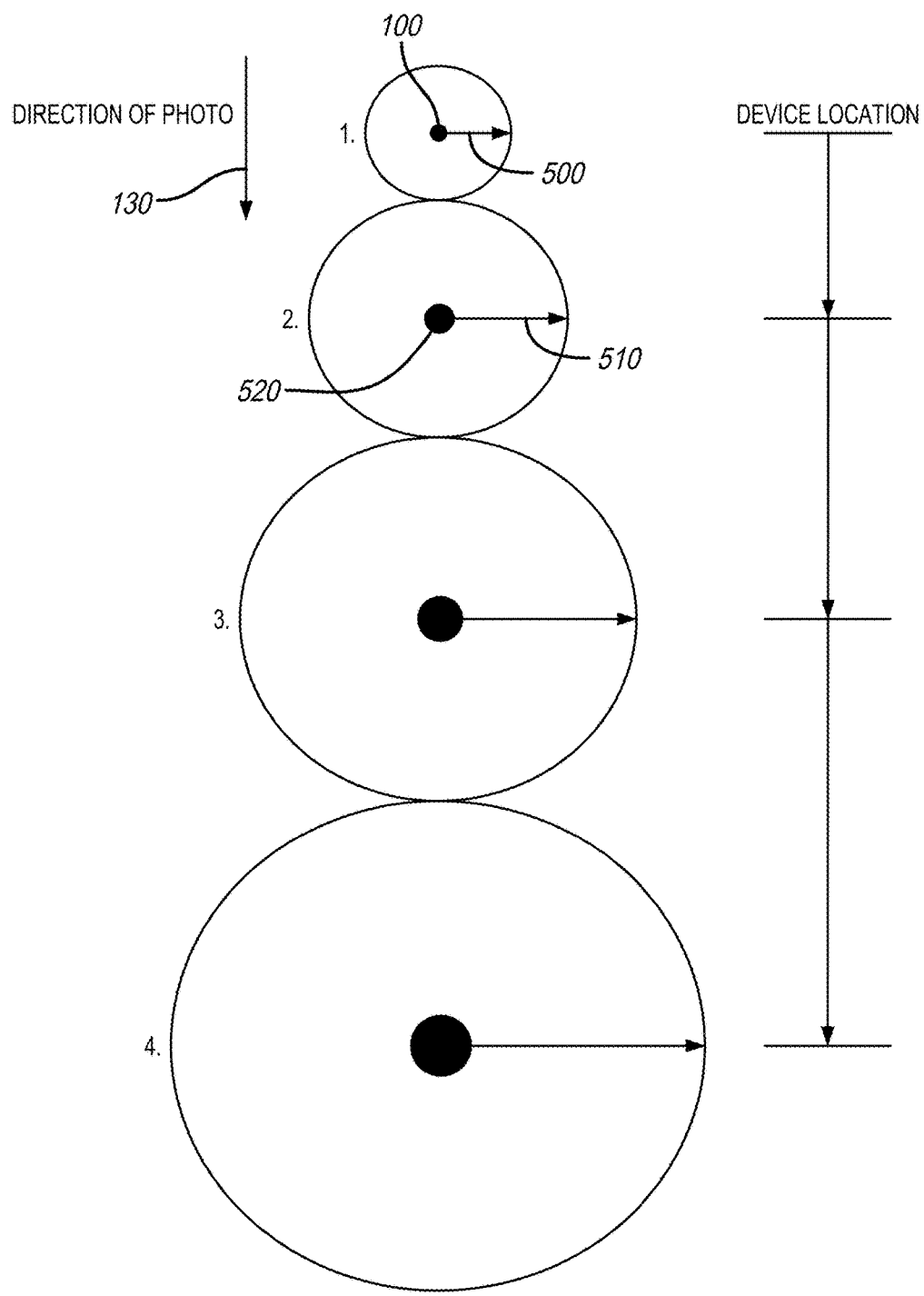
FIG. 15 illustrates filtering logic used in one part of an exemplary embodiment of the present invention.
Figure 16:
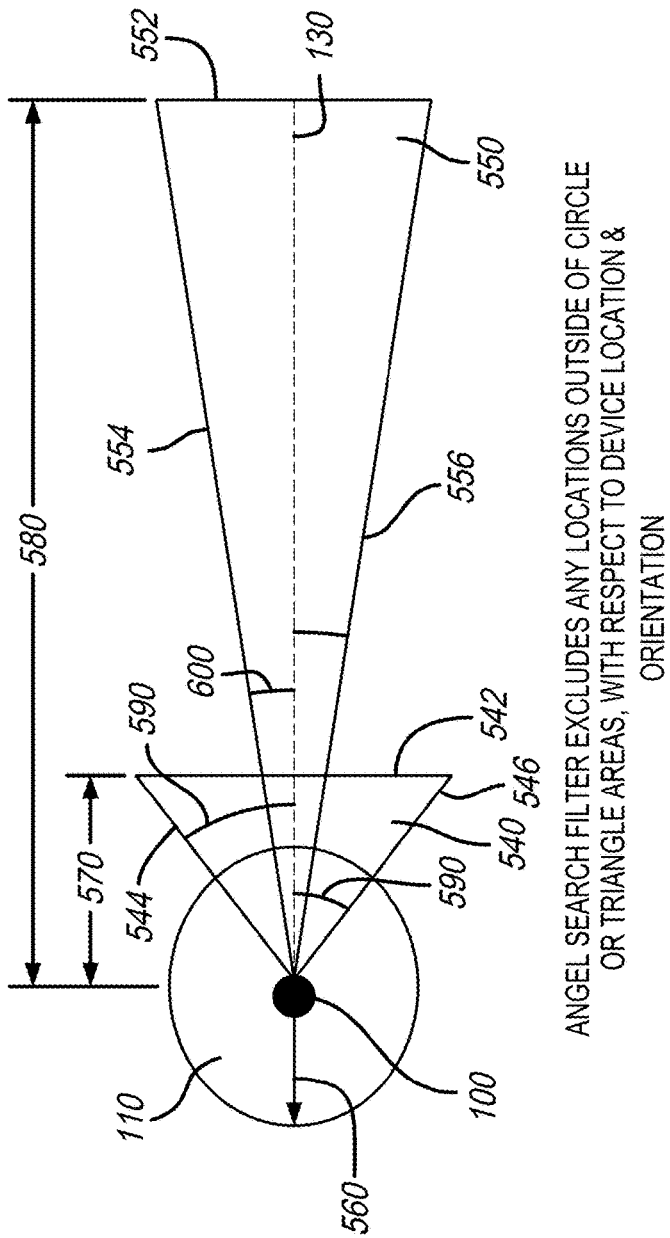
FIG. 16 illustrates the filtering logic used in one part of an exemplary embodiment of the present invention.

FIGS. 14-16 show a preferred embodiment of the location based retrieval module. As shown in FIG. 14, depicting the operation of a preferred embodiment of the present invention, the server (220) receives the device location (100) and location heading (130) from the device (200). In a preferred embodiment, a user uses the software application (90) executing on the device (200) to take a photo and the software application (90) generates (470) and optimizes (480) a digital image file. In a preferred embodiment, the software application executing on the device optimizes digital image file (470) (480) by reducing the size of the digital image file (470). In a preferred embodiment, the server (220) receives a digital image file (470) from a device (200). Preferably, the server (220) then processes the device location and device heading. In a preferred embodiment, the server (220) then collects (490) information including locations relating to points of interest within a first predetermined distance from the device location. In a preferred embodiment, the server (220) searches for points of interest within a first predetermined distance from the device location by transmitting the device location coordinates to at least one application programming interface (API). In a preferred embodiment, the first predetermined distance is between 10 meters and 6000 meters. In a more preferred embodiment, the first predetermined distance is between 1000 and 4000 meters. In a most preferred embodiment, the first predetermined distance is about 3,200 meters. In a preferred embodiment, such APIs include one or more of APIs provided by Foursquare, Wikipedia, Factual, Viator, Uber, Trip Advisor, Flikr, Fandango, IMDB and Yelp. It will be understood by one of ordinary skill in the art that the use of the aforementioned APIs is merely exemplary and that in a preferred embodiment other APIs, including an API provided by the digital search system itself, can be used to search for points of interest. The results of a search on one API can be run against the results of any other API FIG. 15 depicts the logic for performing the search (490) using the FourSquare API in a preferred embodiment of the present invention. As shown in FIG. 15, the device location is at the center of bubble 1 having a first radial distance (500). Preferably, the server sends a search request to the FourSquare API with the device location (100) and requesting all results within the first radial distance (500) from the device location (100) (referred to herein as the "first location"). The server then adjusts the location in the direction of the device heading (130) by a distance equal to the first radial distance (500) plus a second radial distance (510), which is larger than the first radial distance, to a second location (as indicated by 520). The server (220) then sends another search request to the FourSquare API with the second location (520) and requesting all results within the second radial distance (510) of the second location (520). Preferably, the search results will be added to the list of results from the prior search of the FourSquare API. Those of ordinary skill in the art will appreciate that the use of this process in a preferred embodiment to search the FourSquare API is merely exemplary and this process could be used to search any other API or service. Those of ordinary skill in the art will appreciate that this process can be repeated until a satisfactory number of search results are collected or until the server (220) has searched satisfactory distance from the original device location (100) (see, e.g., bubbles 3 and 4 in FIG. 15).

In a preferred embodiment, the digital search system can search for points of interest by executing a search against a database, files, or an index. Returning to FIG. 13, in a preferred embodiment, the search returns a data structure comprising information relating to points of interest. Preferably, the points of interest include businesses. It will be appreciated by those of ordinary skill in the art that points of interest can include landmarks, monuments, parks, outdoor features, geographical features, and the like. Preferably, the information relating to points of interest includes the location(s) of points of interest. In a preferred embodiment, the information relating to points of interest includes a name or title of the points of interest. It will be appreciated by those of ordinary skill in the art that other information relating to points of interest may also include metadata, ratings, reviews, images, descriptions, categories, tags, or any other information that may be related to a point of interest.

In a preferred embodiment of the present invention, the server (220) then filters the data structures comprising collected information relating to points of interest (530) (referred to herein as an "angel search" based on the shape shown in FIG. 16). Preferably, for each source (including APIs) returning results in response to the search described in the paragraph supra, the server filters the data structures received from each source.

FIG. 16 depicts the "angel search" filtering logic used by a preferred embodiment of the present invention. As shown in FIG. 16, in a preferred embodiment, the server (220) uses a location-based filtering module (40) (see FIG. 1) programmed to: 1) receive at least one data structure; 2) exclude data structures having a location outside of a predetermined near/radial range from the device location (100); 3) exclude data structures having a location outside of a first triangle shaped range (540) near the location (100) of the device, wherein the first triangle shaped range (540) starts from the location of the device (100) and spreads out toward the direction of the heading of the device (130); 4) exclude data structures having a location outside a second triangle shaped range (550) near the location (100) of the device, wherein the second triangle shaped range (550) starts from the location of the device (100) and spreads out toward the direction of the heading of the device (130); and 5) if the number of remaining data structures exceeds a first predetermined quantity, exclude the data structures having locations that are the greatest distance from the device until the number of remaining data structures does not exceed the first predetermined quantity. Preferably, the near/radial range will be a circle around the device location (100) having a radial distance (560) of about 10 meters. However, those of ordinary skill in the art will appreciate that the radial distance (560) can be a circle around the device location (100) with a radius of between 1 to 100 miles. More preferably, the radius is between 1 meter and 10 miles. Most preferably, the radius is between about 1 and 1000 meters. In a preferred embodiment, the first predetermined quantity is within the range of 5-100. In a more preferred embodiment, the first predetermined quantity is within the range of 10-50. In a most preferred embodiment, the first predetermined quantity is 20. Preferably, and as shown in FIG. 16, the first triangle shaped range (540) includes a first line 542 generally perpendicular to the device heading 130 that intersects the device heading 130 at a second distance (570) from the device location (100). The first triangle shaped range (540) also includes second and third lines (544) and (546) that extend outwardly from the device location (100) at an angle (590) from the device heading 130. Likewise, in a preferred embodiment, the second triangle shaped (550) includes a first line 552 generally perpendicular to the device heading 130 that intersects the device heading 130 at a second distance (580) from the device location (100). The second triangle shaped range (550) also includes second and third lines (554) and (556) that extend outwardly from the device location (100) at an angle (600) from the device heading 130. It will be appreciated by those of ordinary skill in the art that preferably, the second distance (570) and third distance (580) may be any positive distance within the range of 1 meter to 100 miles. Those of ordinary skill in the art will appreciate that the filtering module can be either software or a component of software executing on the server, or located on another server or machine.

Returning to FIG. 14, in a preferred embodiment of the present invention, the server (220) then again searches for matches against the various sources using the filtered information (610 and 620). By way of non-limiting example, in a preferred embodiment, the information received from the Wikipedia API and then filtered is sent to the FourSquare API (620). Likewise, in a preferred embodiment, the information that was received from the FourSquare API and filtered would be sent to the Wikipedia API (610). In a preferred embodiment, location names are used to search another source or API for matches. Preferably, any matches returned from the APIs are saved to a list. As shown in FIG. 14, in a preferred embodiment, if the number of results from Wikipedia is greater than 0, then a number of results from the search of the Factual API are added to a list. Otherwise, preferably, if the number of results from the first searches of Wikipedia and FourSquare is 0, then results from the search of the Factual API are saved to a list until the list contains the predetermined number of results (640). In a preferred embodiment, the list of results from the Factual API is then used to search the Wikipedia API and the results of this search are added to a list (650). Preferably, the location name will be used to search for matches. Those of ordinary skill in the art will appreciate that the described use of specific APIs in a preferred embodiment is merely exemplary and any specifically named API can be replaced by another API or search service.

In a preferred embodiment of the present invention, the server (220) then sorts the lists of collected information into an aggregated list 660. Step 660 is performed by a sorting module (60) programmed to: 1) receive at least one data structure; 2) order the data structures based on at least a confirm count related to a point of interest; and 3) if the number of data structures exceeds a second predetermined quantity, exclude the data structures that are ordered last according to step 2 until the number of remaining data structures does not exceed the second predetermined quantity. Preferably, the confirm count related to a point of interest will be stored in a data file (50) accessible to the server (220). In a more preferred embodiment, step 2, which is performed by the filtering module orders the locations according to the following order: 1) businesses with a confirm count greater than zero and within a first predetermined distance from the device location; 2) locations with a confirmation count greater than zero, having a Wikipedia or Factual category of "Landmark," and located within a second predetermined distance from the device location; 3) businesses with a confirm count of zero and within the first predetermined distance from the device location; 4) locations with a confirm count of zero, having a Wikipedia or Factual category of "Landmark," and located within the second predetermined distance from the device location; and 5) businesses having deals and located within the region between the first predetermined distance from the device location and the second predetermined distance from the device location, further ordered by greatest to least according to confirm count. In a most preferred embodiment, the second predetermined quantity is about 20, the first predetermined distance is about 500 meters, and the second predetermined distance is about 3200 meters. However, those of ordinary skill in the art will appreciate that these predetermined values are merely exemplary and any positive value can be used. Those of ordinary skill in the art will also appreciate that the described use of specific APIs in a preferred embodiment is merely exemplary and any specifically named API can be replaced by another API or search service. Those of ordinary skill in the art will further appreciate that the use of the "Landmark" category as a factor by which search results are ordered is merely exemplary and that any category can be used to sort the search results.

As shown in FIG. 14, in a preferred embodiment of the present invention, the server (220) then sends the sorted list of information to the device (200).

Figure 17:
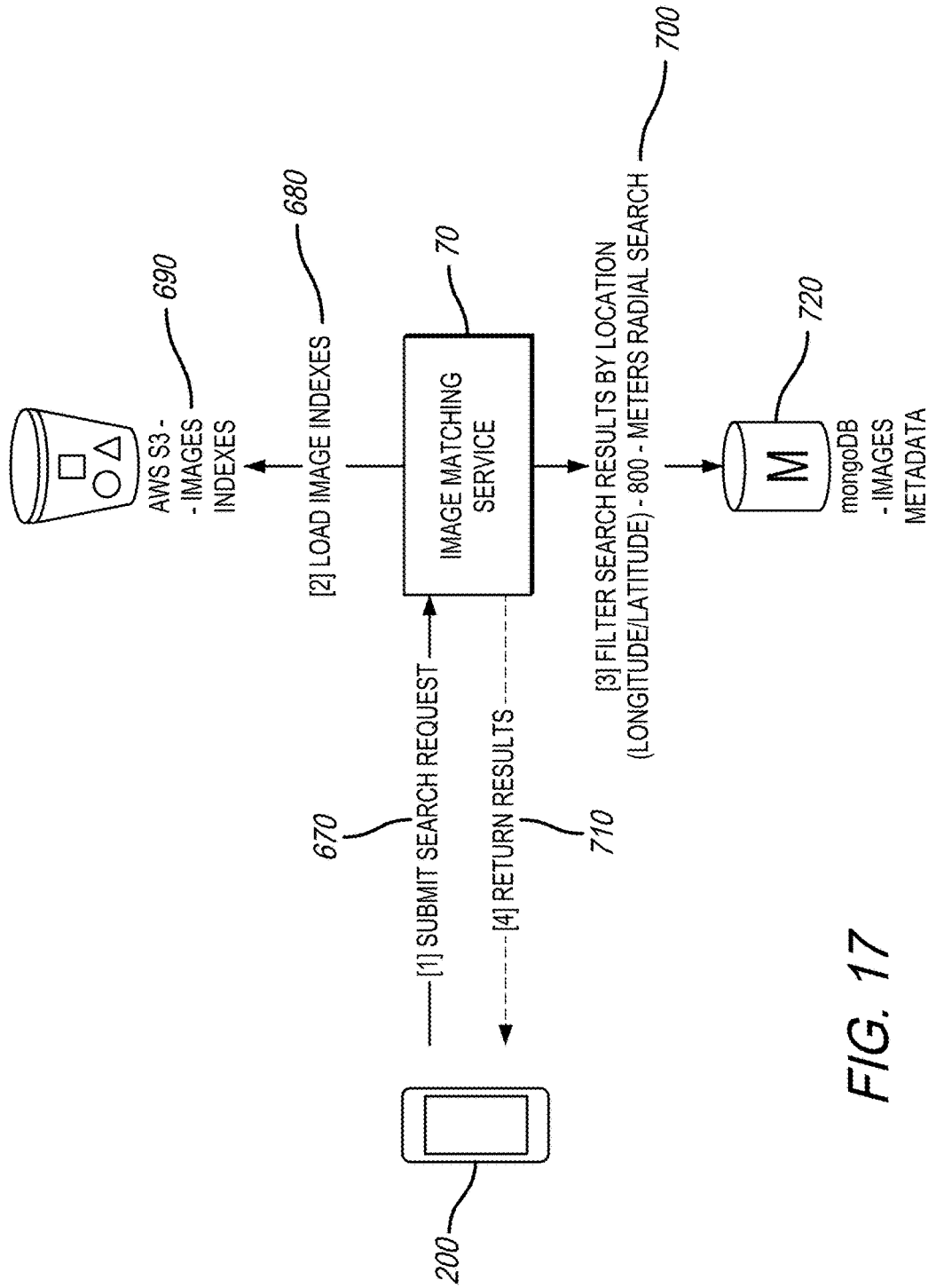
FIG. 17 illustrates an overview of the image matching process used by an exemplary embodiment of the present invention.
Figure 18:
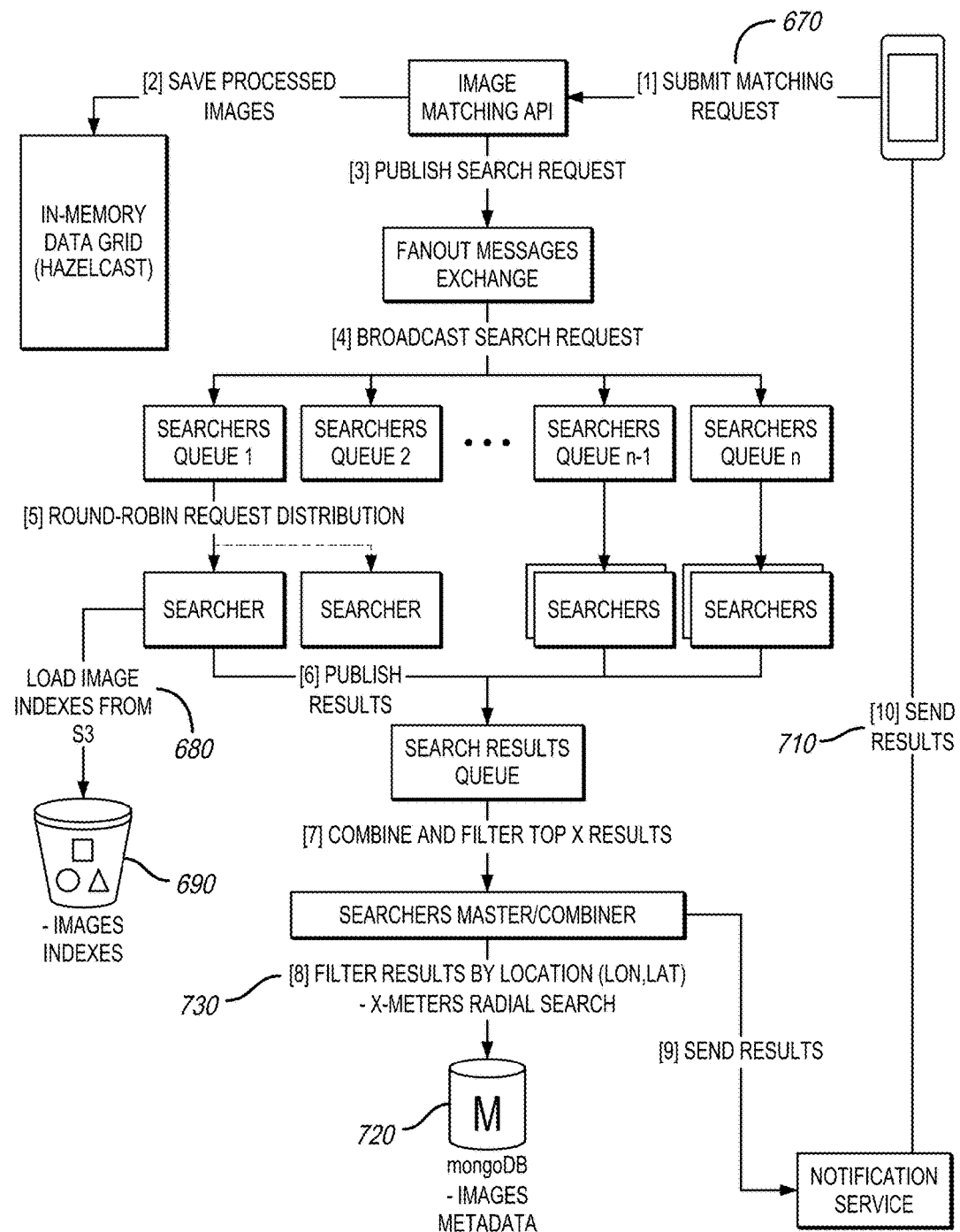
FIG. 18 illustrates the image matching process of a preferred embodiment of the present invention.

FIGS. 17 and 18 show a preferred embodiment of the image based retrieval module. FIG. 17 shows that in a preferred embodiment, the software application (90) executing on the device (200) sends a digital image file (470) containing a photograph to the server (200). Preferably, the server (200) then sends the digital image file (470) to an image matching service or image matching module (30). Those of ordinary skill in the art will appreciate that the image matching service or image matching module (30) can be software or a component of software executing either on the server or on a separate server or machine. In a preferred embodiment, the image matching service loads 680 an image index (690). In a preferred embodiment, the image matching service then searches for images similar to that of the digital image file (470) received from the device (200). Preferably, the server then filters (700) the search results by location and excludes results having a location outside of a predetermined distance from the device location. In a preferred embodiment, the server uses a filtering module to filter the search results. Preferably, the results are returned (710) to device (200) (710, ref no. [4]).

FIG. 18 depicts in greater detail the operation of the preferred embodiment depicted in FIG. 17. In the first step (670), a software application (90) executing on the device (200) sends a digital image file (470) containing a photograph to the server (220) for matching. In a preferred embodiment, the server (220) uses an image matching module (30) programmed to: 1) receive a digital image file; 2) convert the image file to a data structure having a hash value; 3) search for data structures relating to images similar to the image in the digital image file; and 4) return a list of data structures resulting from the search in step 3. In a preferred embodiment, the server submits the digital image file to an image matching API. Those of ordinary skill in the art will appreciate that the image matching module (30) can be software or a component of software executing either on the server (220) or on a separate server or machine.

Preferably, the image matching API saves processed images to an in-memory data grid. In a preferred embodiment, the server uses a Hazelcast in-memory data grid, but those of ordinary skill in the art will appreciate that the use of an in-memory data grid is merely exemplary, as is the use of the Hazelcast in-memory data grid specifically. Preferably, the server then publishes a search request to a fanout messages exchange. Then, the server broadcasts a search request to multiple searchers queues. Those of ordinary skill in the art will appreciate that the use of multiple searchers queues and searchers is merely exemplary and a single searcher queue and searcher may also be used. In a preferred embodiment, a searcher is a software component or module that loads an index and performs a search against that index. Next, round-robin request distribution is used to load balance search requests in the searchers queues across the various searchers. Those of ordinary skill in the art will appreciate that the use of round-robin load balancing is merely exemplary and other load balancing techniques can be used. Those of ordinary skill in the art will also appreciate that the use of load balancing is merely exemplary. The searcher(s) then load the image indexes (690) into memory for searching. In a preferred embodiment, the searcher(s) will compare the hash value of images stored in the image index against the hash value of the received digital image file (470). Preferably, the image index (690) will return the hash values of matching images along with a matching score such that a higher matching score indicates that a matching image has more features in common with the digital image file (470). Preferably, the image indexes (690) will be located on an Amazon S3 server, however, it will appreciated by those of ordinary skill in the art that the use of the S3 server to store and retrieve the image indexes (690) is merely exemplary and that any type of digital storage may be used. Next, the search results from the searchers are published to a search results queue. Preferably, the server (220) will use the OpenIMAJ open source library and/or a fork of the open source ImageTerrier library to perform steps 5 and 6. Those of ordinary skill in the art will understand that the use of OpenIMAJ and/or ImageTerrier are merely exemplary and that any image matching library or programming may be used to perform one or both of the steps 5 and 6. In a preferred embodiment, the server (220) then combines and filters the search results from the queue. Preferably, the server (220) uses a searchers master/combiner module that is programmed to combine the results from the search results queue in order of matching score and then exclude search results exceeding a predetermined quantity of search results. In a preferred embodiment, there is provided an images metadata database (720) for storing and retrieving hash values and metadata that correspond to images. Preferably, the metadata stored includes at least one of tags, descriptions, titles, GPS coordinates, and location. In a preferred embodiment, a search against the images metadata database (720) returns hash values and metadata. Preferably, the images metadata database (720) is a MongoDB database. However, this is not a limitation. Next, preferably, the server (220) further filters the search results by excluding search results having a location that is greater than a predetermined distance from the device location (100) (730). Preferably, the server (220) further filters the search results by searching the images metadata database (720) for results having a location only within the predetermined distance from the device location (100). However, it will be appreciated by those of ordinary skill in the art that the server (220) may use a filtering module (80) or software routine that is on the server (220) or on another machine to filter the results prior to searching the images metadata database.

As shown at step 9, in a preferred embodiment of the present invention, the searchers master/combiner sends the results to a notification service. Those of ordinary skill in the art will appreciate that in a preferred embodiment, the notification service can be software or a component of software executing on the server or on a separate server or machine. In a further preferred embodiment, the server can be programmed to send the results directly to the device.

Lastly, the notification service sends the results to the device (200).

Figure 19:
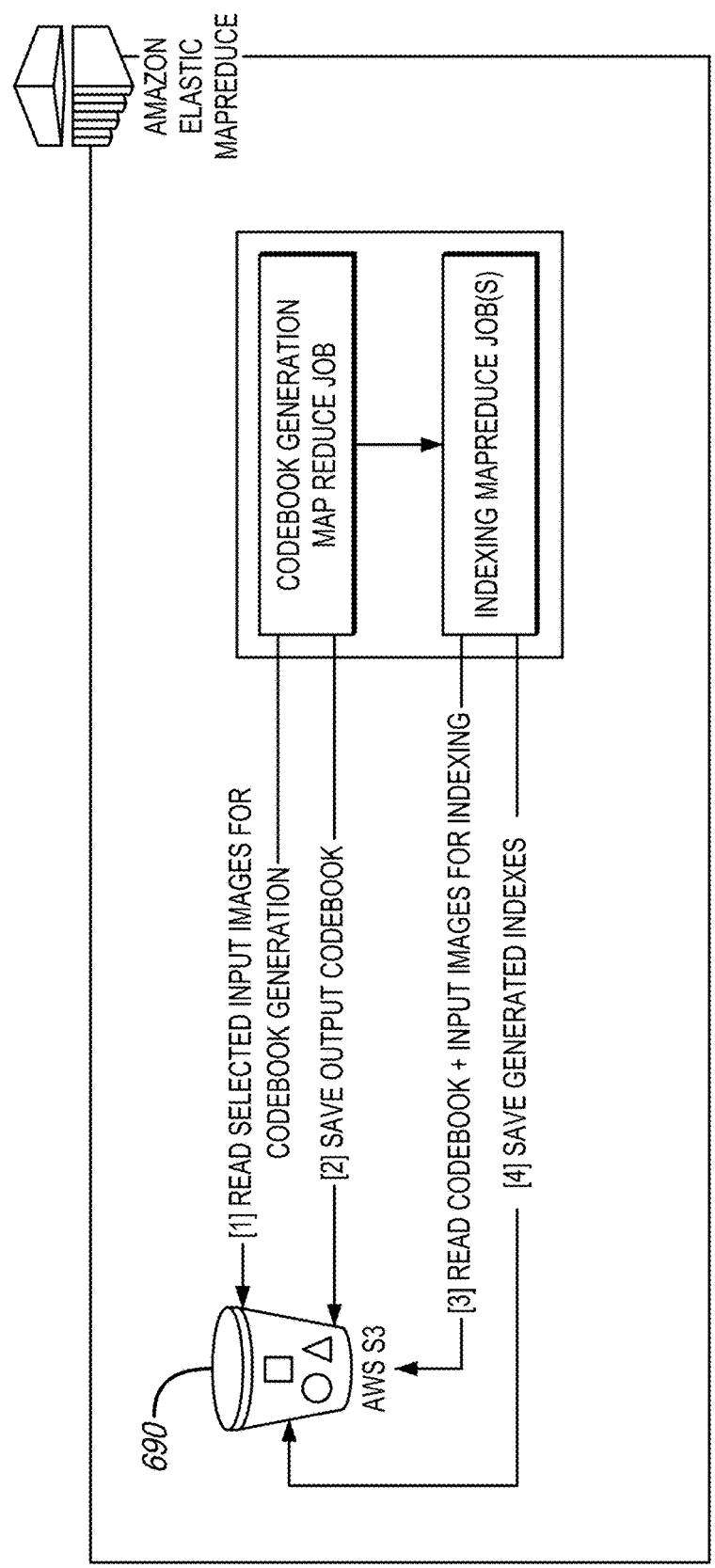
FIG. 19 illustrates the codebook and index generation process of a preferred embodiment of the present invention.

FIG. 19 depicts the process for generating and storing a codebook and index for images in a preferred embodiment of the present invention. Preferably, there is provided a codebook generation job that is a software routine. In a preferred embodiment, the codebook generation job can be executing on the server or on a separate server or machine. Preferably, the codebook generation job is a MapReduce job. Step 1 shows that the codebook generation job of a preferred embodiment reads selected input images for codebook generation. Preferably, the codebook generation job generates a codebook relating to the input images. In a preferred embodiment, the input images are stored in Amazon S3 storage. In a preferred embodiment, the codebook generation job performs step 2, which is store the generated codebook. Preferably, the codebook generation job will save the codebook to Amazon S3 storage. In a preferred embodiment, there is also provided an indexing job. Preferably, the indexing job is a MapReduce job. Step 3 shows that in a preferred embodiment, the indexing job reads the codebook and the input images. Preferably, the indexing job then generates indexes of the input images. In a preferred embodiment, the indexing job generates indexes by mapping the codebook values to the input images or hash values of the input images. Step 4 shows that in a preferred embodiment, the indexing job then saves the generated indexes 690 to Amazon S3 storage. It will be appreciated by those of ordinary skill in the art that the use of Amazon S3 storage by a preferred embodiment to perform the steps in FIG. 19 is merely exemplary and that any data storage can be used.

Figure 20:
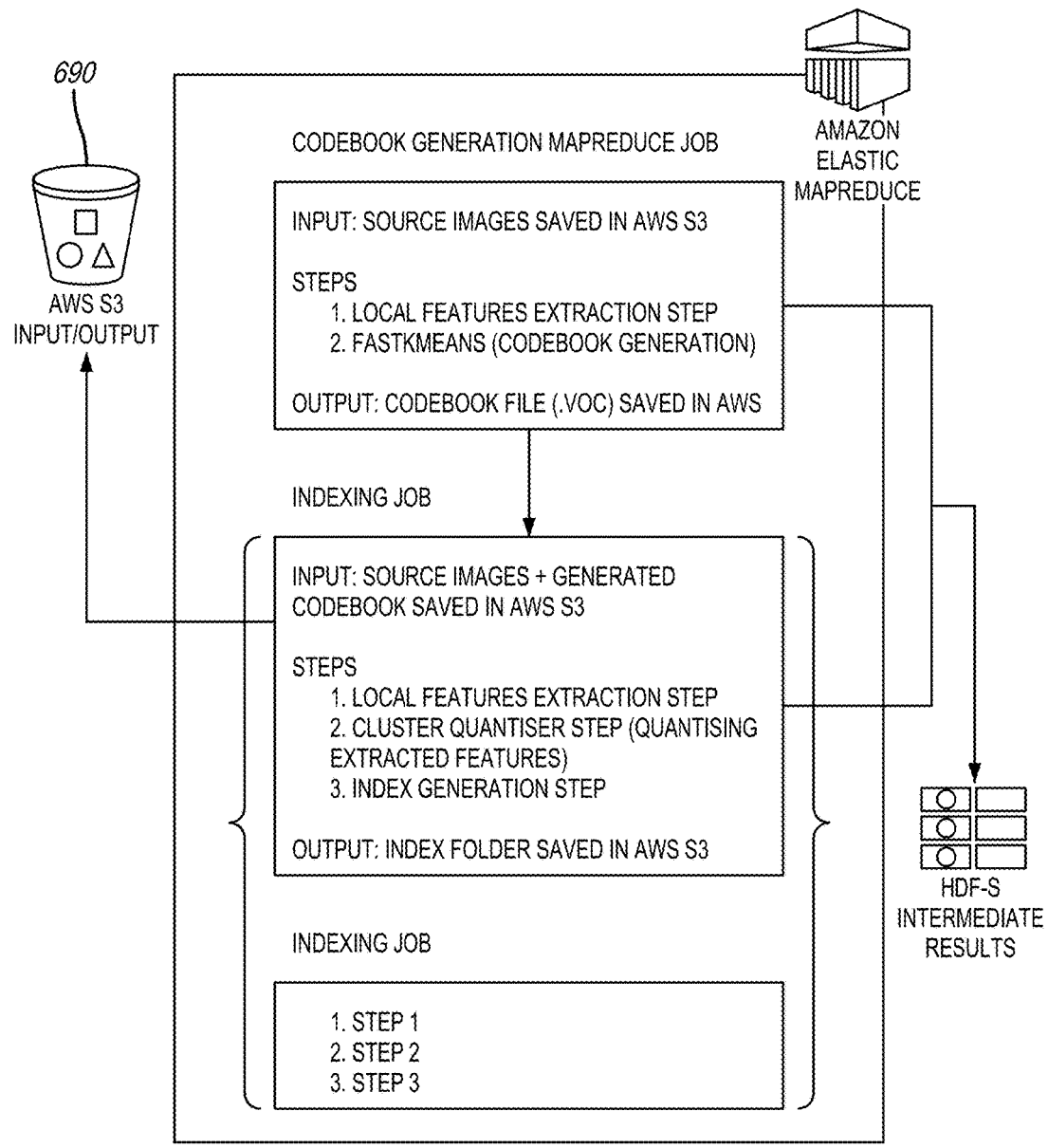
FIG. 20 illustrates the codebook and index generation process of a preferred embodiment of the present invention.

FIG. 20 depicts in further detail the codebook generation and indexing jobs of a preferred embodiment of the present invention shown in FIG. 19. As shown in FIG. 20, in a preferred embodiment, the codebook generation job accepts as input source images, also described herein as input images. Preferably, the codebook generation job then performs the step of local feature extraction, which is to extract a desired feature in an image (e.g., if a picture of a street is taken, the extracted images may be, buildings, monuments or landmarks). Preferably, the codebook generation job then performs a FastKMeans codebook generation step, which actually generates the codebook of extracted features. In a preferred embodiment, as shown in FIG. 19, the indexing job reads the source images and codebook and extracts the local features of the source images, then performs a quantiser step in which the indexing job compares the features extracted from the source image to features in the codebook, and then generates an index file or folder comprising hash values of the source images.

Figure 21:
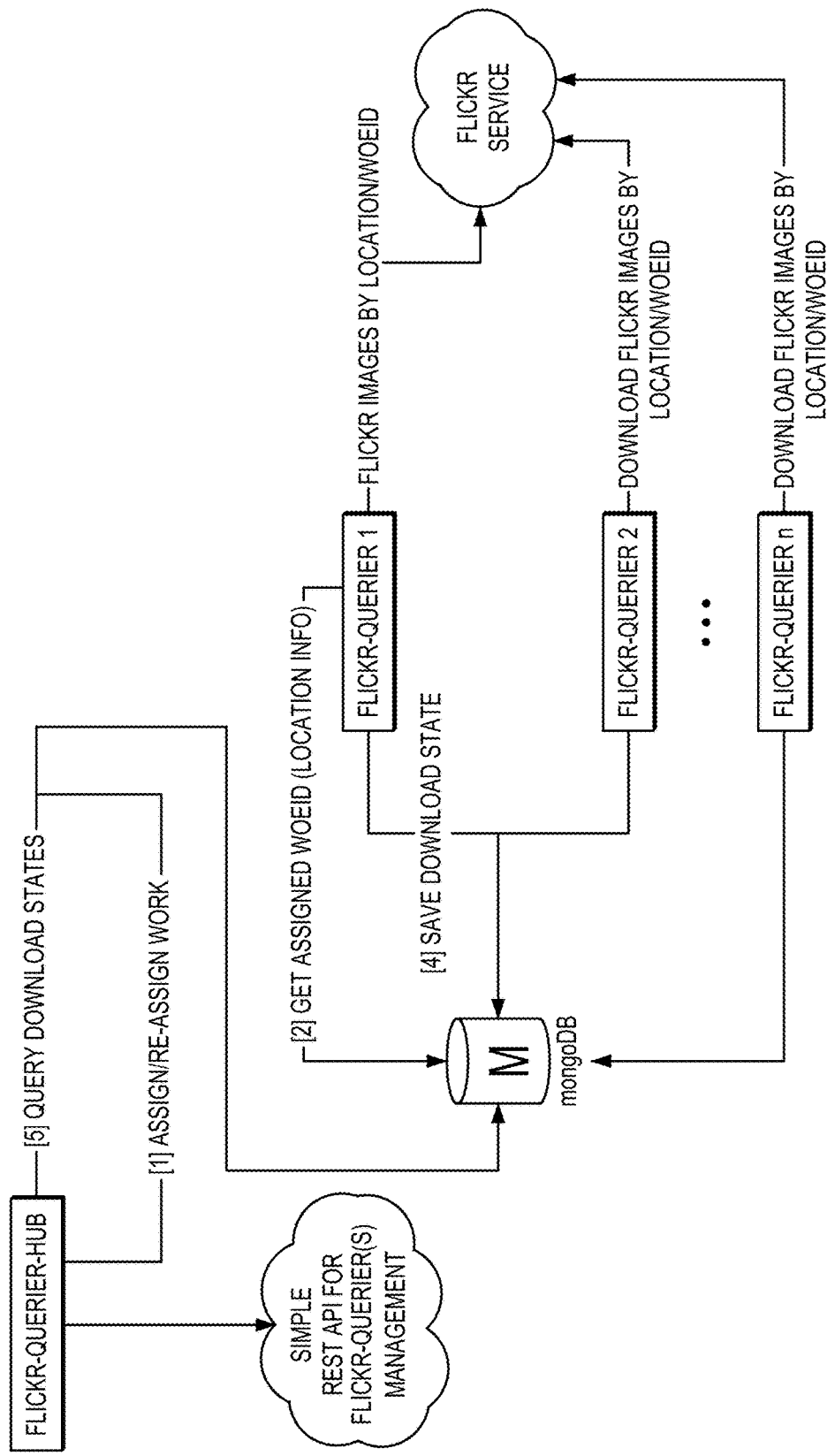
FIG. 21 illustrates the logic for downloading images used by a preferred embodiment of the present invention.

FIG. 21 depicts a process performed by a preferred embodiment to download images from the Flickr API to images metadata database. Those of ordinary skill in the art will appreciate that the process shown in FIG. 21 can be performed by software or a component of software executing on the server or on another server or machine. Those of ordinary skill in the art will also appreciate that the use of the Flickr API in a preferred embodiment is merely exemplary and any image downloading API can be used.

Figure 22:
FIG. 22 illustrates an exemplary screenshot of the software application of a preferred embodiment of the present invention running on a device.
Figure 23:
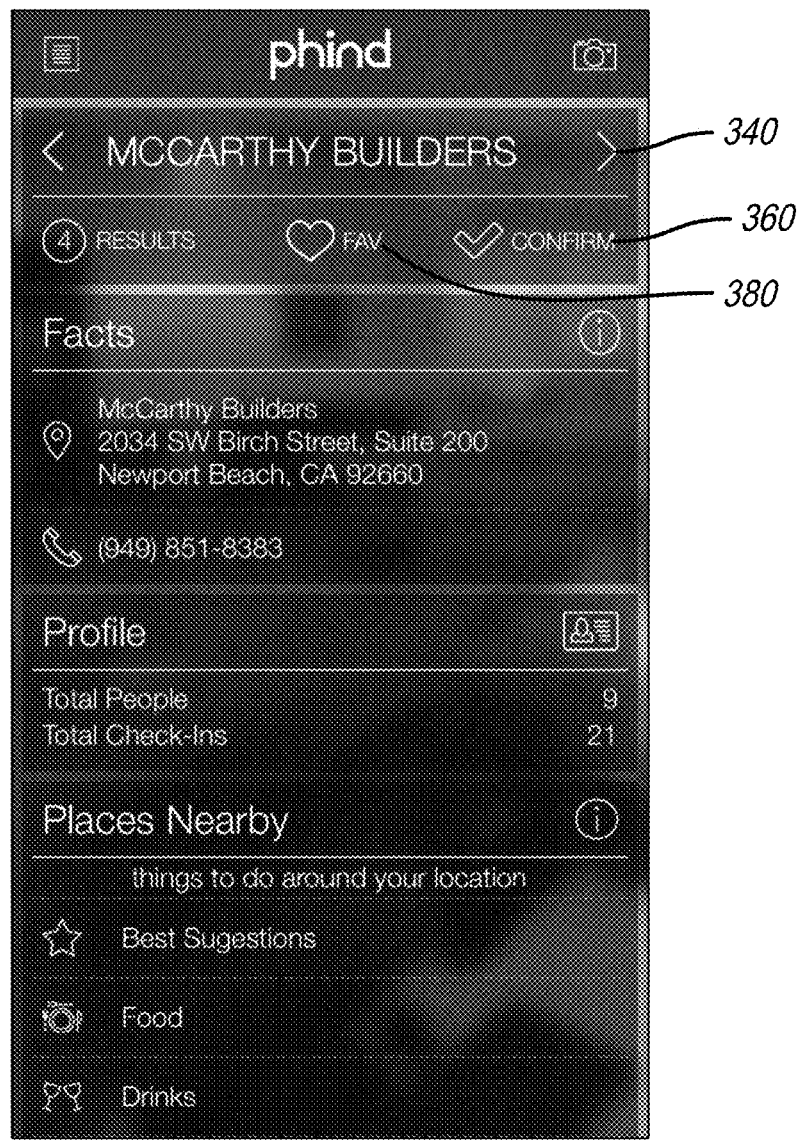
FIG. 23 illustrates an exemplary screenshot of the software application of a preferred embodiment of the present invention running on a device displaying a most likely match.
Figure 24:
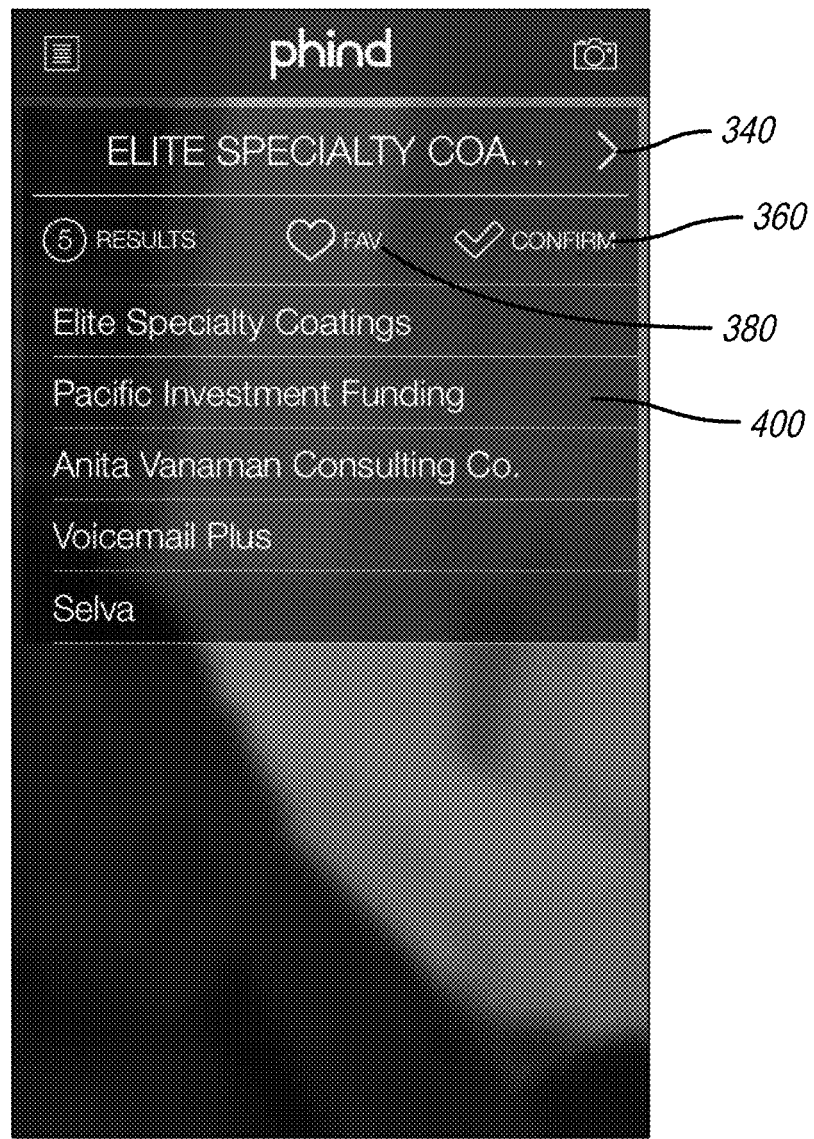
FIG. 24 illustrates an exemplary screenshot of the software application of a preferred embodiment of the present invention running on a device displaying a list of likely matches in response to a user search.
Figure 25:
FIG. 25 illustrates an exemplary screenshot of the software application of a preferred embodiment of the present invention running on a device displaying suggested categories of points of interest in proximity to the location of the device.
Figure 26:
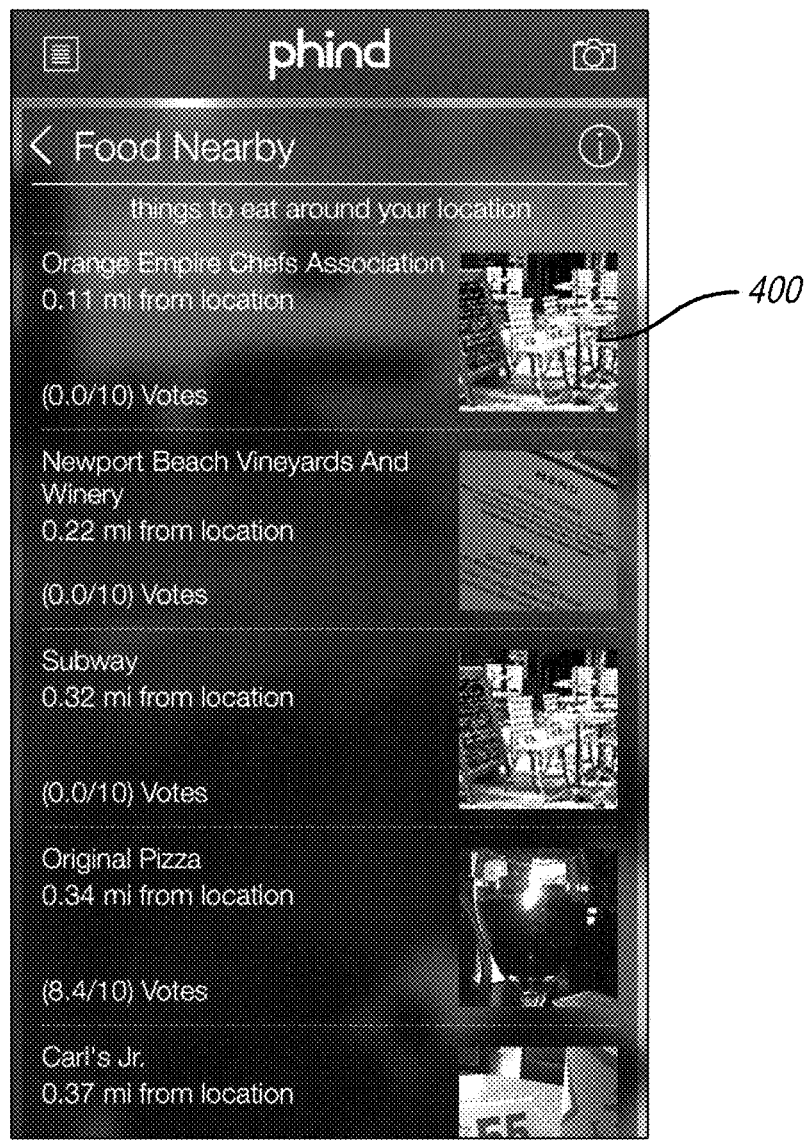
FIG. 26 illustrates an exemplary screenshot of the software application of a preferred embodiment of the present invention running on a device displaying a list of restaurant locations in proximity to the location of the device.
Figure 27:
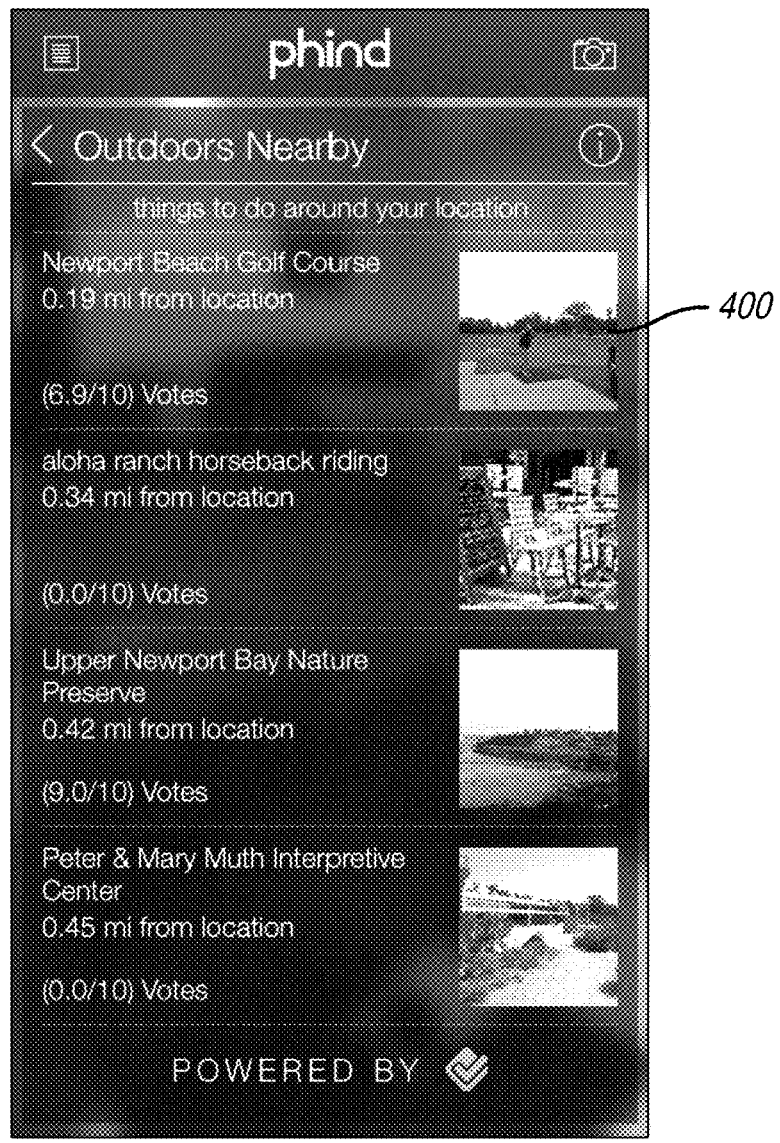
FIG. 27 illustrates an exemplary screenshot of the software application of a preferred embodiment of the present invention running on a device displaying a list of outdoor points of interest in proximity to the location of the device.
Figure 28:
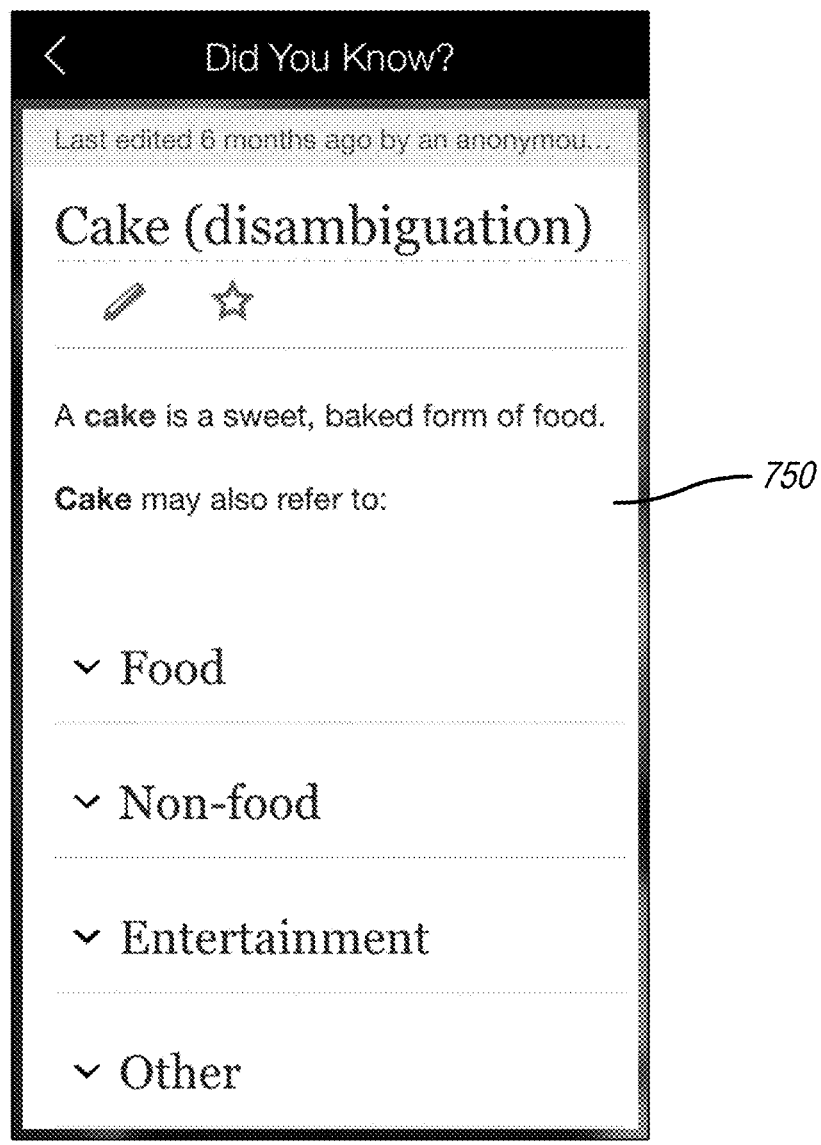
FIG. 28 illustrates an exemplary screenshot of the software application of a preferred embodiment of the present invention running on a device displaying information related to a search.
Figure 29:
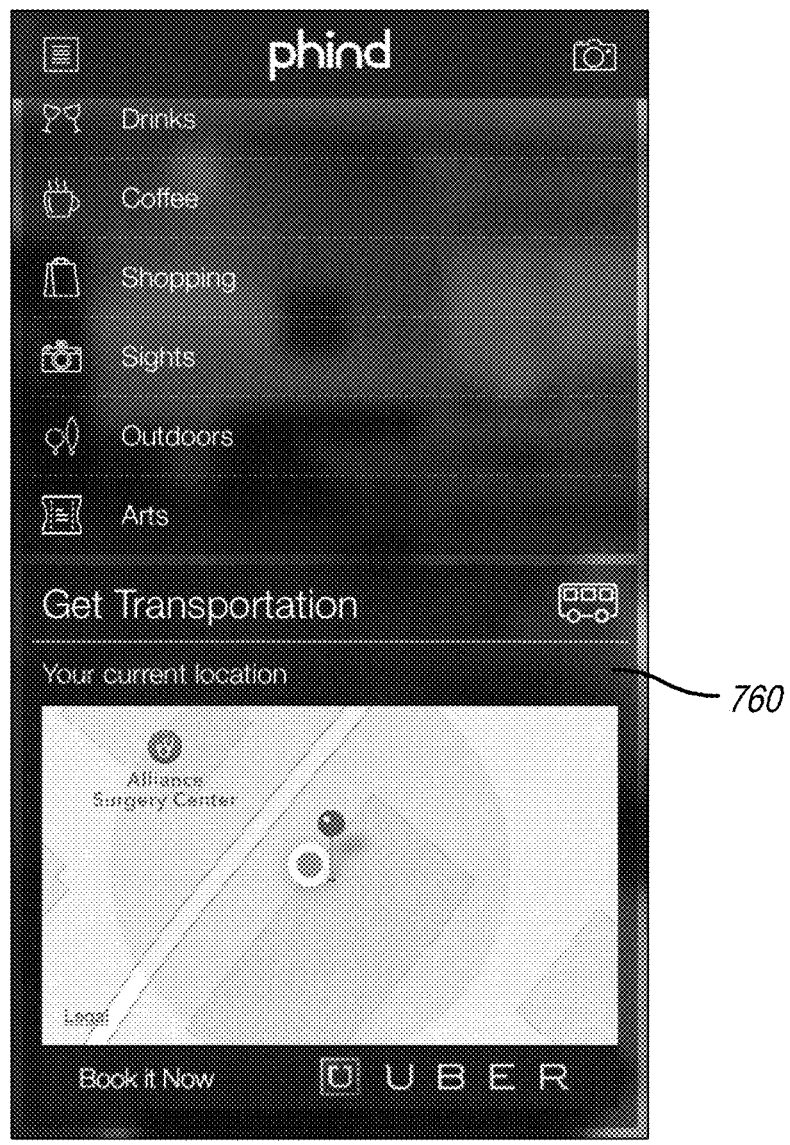
FIG. 29 illustrates an exemplary screenshot of the software application of a preferred embodiment of the present invention running on a device providing an option to send a request for transportation.

FIG. 22 is a screenshot of a preferred embodiment of the application component running on a mobile device;

FIG. 23 is a screenshot of a preferred embodiment of the application component running on a mobile device showing the most likely match that is presented to a user after performing a search;

FIG. 24 is a screenshot of a preferred embodiment of the application component running on a mobile device showing the full list of likely location matches in response to a user search;

FIG. 25 is a screenshot of a preferred embodiment of the application component running on a mobile device showing places nearby;

FIG. 26 is a screenshot of a preferred embodiment of the application component running on a mobile device showing food nearby;

FIG. 27 is a screenshot of a preferred embodiment of the application component running on a mobile device showing outdoor points of interest nearby;

FIG. 28 is a screenshot of a preferred embodiment of the application component running on a mobile device showing interesting facts; and FIG. 29 is a screenshot of a preferred embodiment of the application component running on a mobile device showing a link to "Get Transportation." In a preferred embodiment, the software application provides a link through which a user can arrange for transportation. In a preferred embodiment, the user can use the software application to send a request to the Uber API.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A digital search system for processing and transmitting information relating to points of interest based on a location and heading of a device, the digital search system comprising:
   a server for receiving and processing the device location and heading information,
   a filtering module for filtering a first group of places of interest to provide a first set of places of interest, wherein the filtering module is programmed to: 1) receive at least one place of interest to form the first group of places of interest; 2) exclude places of interest having a location outside of a predetermined radial range from the device location; and 3) if the number of remaining places of interest exceeds a first predetermined quantity, exclude the places of interest having locations that are the greatest distance from the device until the number of remaining places of interest does not exceed the first predetermined quantity, whereby the first set of places of interest is provided,
   a data file comprising at least one confirm count related to a point of interest, wherein the confirm count is the number of times the point of interest has been confirmed by a previous user, wherein a user interface allows a user to confirm a point of interest, and wherein the server increments the confirm count related to a point of interest in response to the user's confirmation;
   a sorting module for receiving and processing the first set of places of interest to provide a second set of places of interest, the sorting module programmed to: 1) receive the first set of places of interest; 2) order the places of interest based on the confirm count; and 3) if the number of places of interest exceeds a second predetermined quantity, exclude the places of interest that are ordered last according to step 2, until the number of remaining places of interest does not exceed the second predetermined quantity, whereby the second set of places of interest is provided.

2. The digital search system of claim 1, wherein the server is programmed to search for points of interest within the predetermined radial range from the device.

3. The digital search system of claim 1, wherein the server uses an API to search for points of interest within the predetermined radial range from the device.

4. The digital search system of claim 1, wherein the sorting module is further programmed to sort the places of interest based on a category related to a point of interest.

5. The digital search system of claim 1, wherein the filtering module is further programmed to exclude points of interest having a location outside of a first triangle shaped range near the location of the device, wherein the first triangle shaped range starts from the location of the device and spreads out away from the location of the device in the direction of the heading of the device.

6. The digital search system of claim 5, wherein the filtering module is further programmed to exclude points of interest having a location outside of a second triangle shaped range near the location of the device, wherein the second triangle shaped range starts from the location of the device and spreads out away from the location of the device in the direction of the heading of the device, and wherein the second triangle shaped range extends further away from the location of the device than the first triangle shaped range.

7. The digital search system of claim 1, further comprising a software application executing on the device for transmitting the location and heading of the device to the server, receiving collected information transmitted from the server, and displaying the collected information to a user.

8. The digital search system of claim 7, wherein the software application provides a user interface, whereby the software application transmits the location and heading of the device to the server, receives collected information transmitted from the server, and displays the collected information in response to a single user interaction.

9. A digital search system for processing and transmitting data structures comprising information relating to points of interest based on a digital image file, the digital search system comprising:
  an image matching module for receiving and processing digital image files, the image matching module programmed to: 1) receive a digital image file; 2) convert the digital image file to a first data structure having at least one hash value; 3) search for hash values corresponding to images similar to the image in the digital image file; and 4) return a second data structure comprising results from the search in step 3;
  a filtering module for receiving and processing data structures, the filtering module programmed to: 1) receive a third data structure comprising hash values corresponding to images; and 2) return a fourth data structure comprising metadata related to images to which the hash values in the third data structure correspond, but excluding metadata where the hash values in the third data structure correspond to an image having a location that exceeds a predetermined distance from the location of the device that captured the digital image file;
  a server for receiving and processing a digital image file from a device used to take a photo and returning metadata related to similar images; the server programmed with one or more software routines executing on the server to: 1) search for images similar to that in the digital image file; 2) filter the results of the search in step 1; 3) transmit a fourth data structure comprising metadata including a title related to the results of step 2; and
  a software application executing on the device to: 1) take a photograph; 2) transmit to the server the digital image file including the photograph; 3) receive a list comprising metadata relating to the contents of the digital image file; and 4) displaying the list to a user;
  wherein the software application provides a user interface, wherein the user interface allows a user to confirm a result on a displayed list, and wherein the server increments a confirm count related to a result in response to the user's confirmation.

10. The digital search system of claim 9, wherein step 3 of the image matching module uses multiple searchers that simultaneously search for data structures relating to images similar to the image in the digital image file, and wherein step 4 comprises combining and filtering the results of step 3 to generate the second data structure if more than one searcher of step 3 returns a result.

11. The digital search system of claim 9, wherein the results of the search in step 3 of the image matching module comprise hash values corresponding to images similar to the image in the digital image file and a matching score.

12. The digital search system of claim 9, further comprising an indexing module for indexing digital image files, the indexing module programmed to: 1) read a digital image file; 2) generate a codebook; 3) read the codebook and at least one digital image file; and 4) generate an image index.

13. A digital search system for processing and transmitting data structures comprising information relating to points of interest based on a digital image file containing a photo taken by a device and the location and heading of the device, the digital search system comprising:
  a location-based retrieval module, the location-based retrieval module comprising
    a location-based filtering module for filtering a first group of places of interest to provide a first set of places of interest, wherein the filtering module is programmed to: 1) receive at least one place of interest to form the first group of places of interest; 2) exclude places of interest having a location outside of a predetermined radial range from the device location; and 3) if the number of remaining places of interest exceeds a first predetermined quantity, exclude the places of interest having locations that are the greatest distance from the device until the number of remaining places of interest does not exceed the first predetermined quantity, whereby the first set of places of interest is provided,
    a sorting module for receiving and processing the first set of places of interest to provide a second set of places of interest, the sorting module programmed to: 1) receive the first set of places of interest; 2) order the places of interest based on a confirm count, wherein the confirm count is the number of times a place of interest has been confirmed by a previous user; and 3) if the number of places of interest exceeds a second predetermined quantity, exclude the places of interest that are ordered last according to step 2, until the number of remaining places of interest does not exceed the second predetermined quantity, whereby the second set of places of interest is provided, and
    a data file comprising at least one confirm count related to a point of interest, wherein a user interface allows a user to confirm a result in a displayed list, and wherein a server increments the confirm count related to the result in response to the user's confirmation; and
  an image-based retrieval module, the image-based retrieval module comprising an image matching module for receiving and processing digital image files, the image matching module programmed to: 1) receive a digital image file; 2) convert the digital image file to a first data structure having at least one hash value; 3) search for hash values corresponding to images similar to the image in the digital image file; and 4) return a second data structure comprising results from the search in step 3, a filtering module for receiving and processing data structures, the filtering module programmed to: 1) receive a third data structure comprising hash values corresponding to images; and 2) return a fourth data structure comprising metadata related to images to which the hash values in the third data structure correspond, but excluding metadata where the hash values in the third data structure correspond to an image having a location that exceeds a predetermined distance from the location of the device that captured the digital image file, and one or more software routines executing to 1) search for images similar to that in the digital image file; 2) filter the results of the search in step 1; 3) generate the fourth data structure comprising metadata including a title related to the results of step 2; and a server for receiving and processing a digital image file and the location and heading of a device used to take the image in the digital image file, the server programmed with one or more software routines executing on the server to: 1) simultaneously use the location-based retrieval module to generate the second set of places of interest based on the location and heading of a device, and the image-based retrieval module to generate the fourth data structure; 2) combine the second set of places of interest and the fourth data structure into a final results list; and 3) transmit the final results list to the device.

14. The digital search system of claim 13, further comprising a software application executing on the device to: 1) take a photograph; 2) transmit to the server a digital image file comprising the photograph, the location of the device, and the heading of the device; 3) receive a list transmitted from the server; and 4) display the list to a user.

15. The digital search system of claim 14, wherein the software application provides a user interface, whereby the software application performs the steps in response to a single user interaction.

* * * * *